United States Patent
Yanagisawa

(10) Patent No.: US 11,385,532 B2
(45) Date of Patent: Jul. 12, 2022

(54) PROJECTION SYSTEM AND PROJECTOR

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/156,170

(22) Filed: Jan. 22, 2021

(65) Prior Publication Data

US 2021/0232027 A1      Jul. 29, 2021

(30) Foreign Application Priority Data

Jan. 23, 2020    (JP) .............................. JP2020-008951

(51) Int. Cl.
*G03B 21/14*      (2006.01)
*G03B 21/00*      (2006.01)
*G03B 21/20*      (2006.01)

(52) U.S. Cl.
CPC ......... *G03B 21/142* (2013.01); *G03B 21/008* (2013.01); *G03B 21/2073* (2013.01)

(58) Field of Classification Search
CPC .... G03B 21/008; G03B 21/28; G03B 21/142; G03B 21/208; G03B 21/2053; G03B 21/2073; G02B 17/02; G02B 17/086; G02B 17/0804; G02B 17/0848; G02B 17/0856; H04N 9/315; H04N 9/317; H04N 9/3141; H04N 9/3152; H04N 9/3158

See application file for complete search history.

(56) References Cited

U.S. PATENT DOCUMENTS

| | | | |
|---|---|---|---|
| 7,048,388 B2 | 5/2006 | Takaura et al. | |
| 7,549,755 B2 | 6/2009 | Suzuki | |
| 7,957,078 B2 | 6/2011 | Minefuji | |
| 8,950,874 B2 | 2/2015 | Tatsuno | |
| 9,946,144 B2 | 4/2018 | Abe et al. | |
| 10,401,597 B2 | 9/2019 | Amano | |
| 10,737,391 B2* | 8/2020 | Takahashi | B25J 9/1664 |
| 2002/0008855 A1* | 1/2002 | Kato | G03B 21/00 353/69 |

(Continued)

FOREIGN PATENT DOCUMENTS

| | | |
|---|---|---|
| JP | 2004-246042 A | 9/2004 |
| JP | 2006-235516 A | 9/2006 |

(Continued)

*Primary Examiner* — Sultan Chowdhury
(74) *Attorney, Agent, or Firm* — Oliff PLC

(57) ABSTRACT

A projection system includes a first optical system including a first lens, and a second optical system including an optical element and disposed at the enlargement side of the first optical system. The first lens is disposed in a position closest to the enlargement side in the first optical system. The optical element has a first transmissive surface, a first reflection surface, a second reflection surface, and a second transmissive surface. The second reflection surface is disposed between the first reflection surface and a first surface of the first lens that is a surface on the enlargement side in a direction along a first optical axis of the first optical system. The second transmissive surface is disposed at a side opposite a side where the first optical system is located with respect to the second reflection surface in the direction.

19 Claims, 17 Drawing Sheets

(56) References Cited

U.S. PATENT DOCUMENTS

| | | | |
|---|---|---|---|
| 2004/0032666 A1* | 2/2004 | Baba | G02B 13/16 |
| | | | 359/639 |
| 2004/0156117 A1 | 8/2004 | Takaura et al. | |
| 2006/0193036 A1 | 8/2006 | Suzuki | |
| 2010/0053737 A1* | 3/2010 | Fujita | G02B 17/0852 |
| | | | 359/364 |
| 2010/0157421 A1* | 6/2010 | Abe | G02B 17/0852 |
| | | | 359/364 |
| 2010/0208364 A1 | 8/2010 | Minefuji | |
| 2013/0070217 A1 | 3/2013 | Tatsuno | |
| 2016/0246035 A1 | 8/2016 | Amano | |
| 2019/0011684 A1 | 1/2019 | Ishihara et al. | |
| 2019/0302601 A1 | 10/2019 | Nagatoshi | |

FOREIGN PATENT DOCUMENTS

| | | | |
|---|---|---|---|
| JP | 2007-316674 A | | 12/2007 |
| JP | 2010-020344 A | | 1/2010 |
| JP | 5030732 B2 | | 9/2012 |
| JP | 2013-242594 A | | 12/2013 |
| JP | 5691962 B2 | | 4/2015 |
| JP | 2016-156982 A | | 9/2016 |
| JP | 2017-156712 A | | 9/2017 |
| JP | 2017-156713 A | | 9/2017 |
| JP | 2017-156714 A | | 9/2017 |
| JP | 2018-138945 A | | 9/2018 |
| JP | 2019-133061 A | * | 8/2019 |
| JP | 2019-174634 A | | 10/2019 |
| JP | 2020-042103 A | | 3/2020 |
| JP | 2020-194115 A | | 12/2020 |

\* cited by examiner

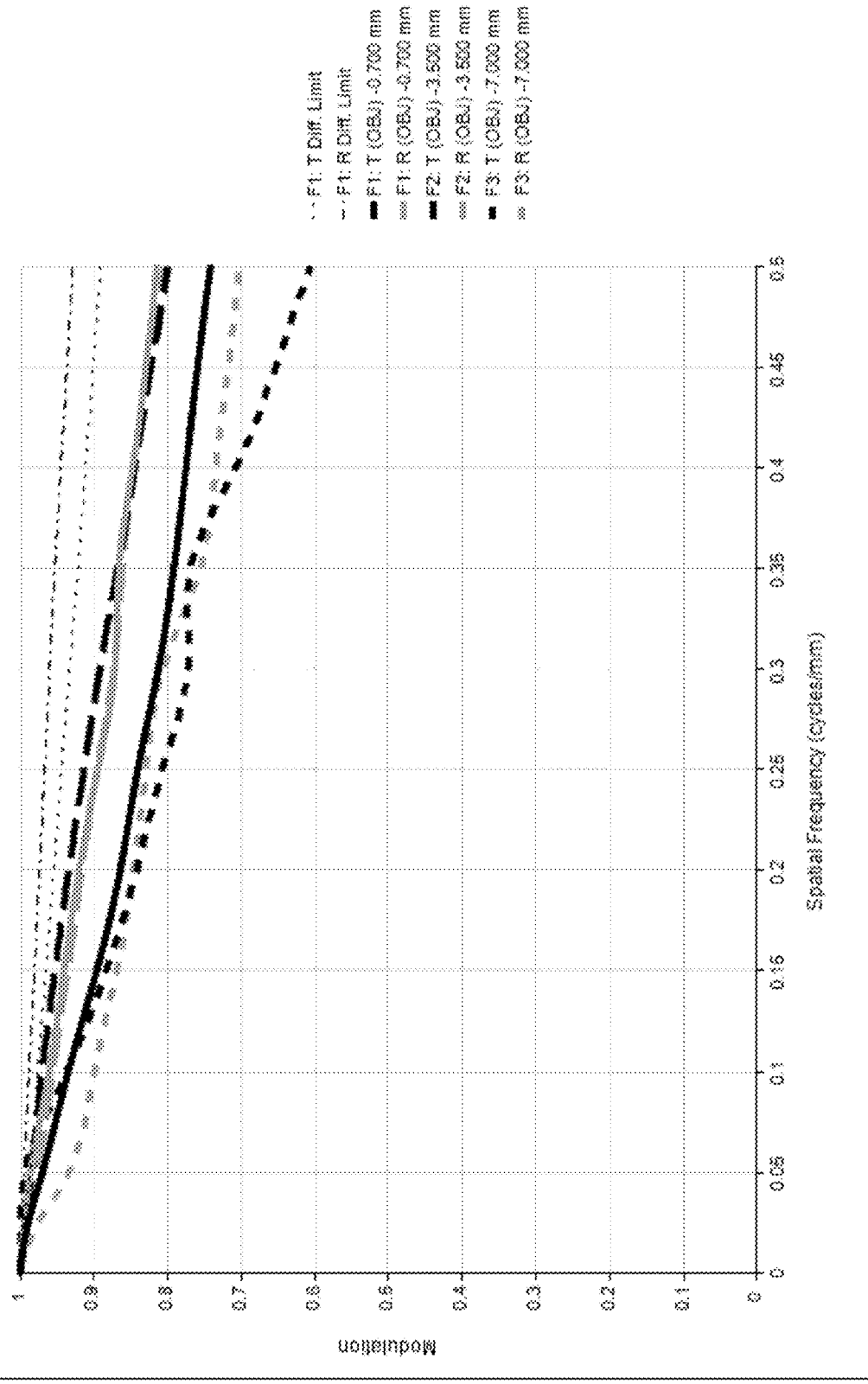

PROJECTION SYSTEM AND PROJECTOR

The present application is based on, and claims priority from JP Application Serial Number 2020-008951, filed Jan. 23, 2020, the disclosure of which is hereby incorporated by reference herein in its entirety.

BACKGROUND

1. Technical Field

The present disclosure relates to a projection system and a projector.

2. Related Art

JP-A-2010-20344 describes a projector that enlarges and projects a projection image formed by an image formation section via a projection system. The projection system described in JP-A-2010-20344 is formed of a first optical system and a second optical system sequentially arranged from the reduction side toward the enlargement side. The first optical system includes a refractive optical system. The second optical system is formed of a reflection mirror having a concave reflection surface. The image formation section includes a light source and a light valve. The image formation section forms a projection image in the reduction-side image formation plane of the projection system. The projection system forms an intermediate image in a position between the first optical system and the reflection surface and projects a final image on a screen disposed in the enlargement-side image formation plane of the projection system.

The projection system and the projector are required to have a shorter projection distance. An attempt to further shorten the projection distance in the configuration using the projection system described in JP-A-2010-20344, however, causes a problem of a difficulty in designing the projection system.

SUMMARY

To solve the problem described above, a projection system according to an aspect of the present disclosure includes a first optical system including a first lens and a second optical system including an optical element and disposed at an enlargement side of the first optical system. The first lens is disposed in a position closest to the enlargement side in the first optical system. The optical element has a first transmissive surface, a first reflection surface disposed at the enlargement side of the first transmissive surface, a second reflection surface disposed at the enlargement side of the first reflection surface, and a second transmissive surface disposed at the enlargement side of the second reflection surface. The second reflection surface is disposed between the first reflection surface and a first surface of the first lens that is a surface on the enlargement side in a direction along a first optical axis of the first optical system. The second transmissive surface is disposed at a side opposite a side where the first optical system is disposed with respect to the second reflection surface in the direction along the first optical axis.

A projector according to another aspect of the present disclosure includes the projection system described above and an image formation section that forms a projection image in a reduction-side image formation plane of the projection system.

BRIEF DESCRIPTION OF THE DRAWINGS

FIG. 17 shows the enlargement-side MTF of the projection system according to Example 4.

DESCRIPTION OF EXEMPLARY EMBODIMENTS

A projection system according to an embodiment of the present disclosure and a projector including the projection system will be described below in detail with reference to the drawings.

Projector

Figure 1:
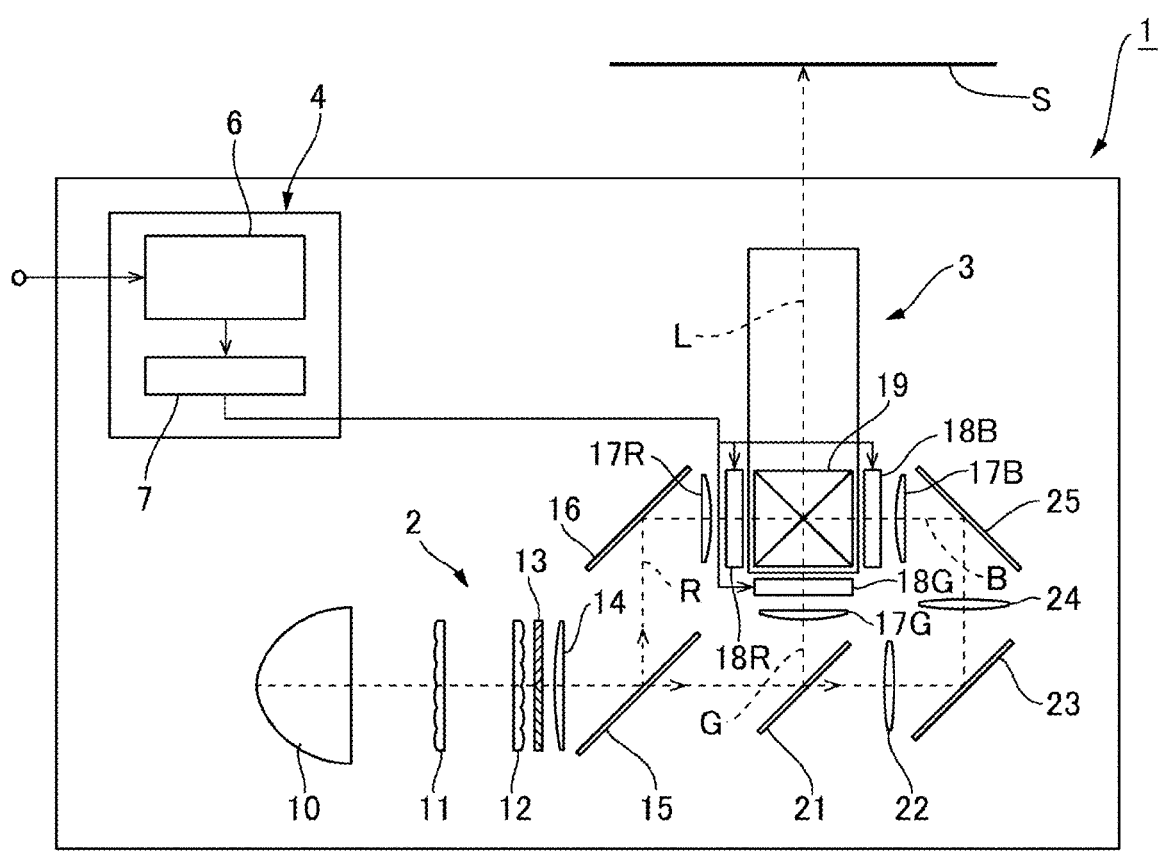
FIG. 1 is a schematic configuration diagram of a projector including a projection system.

FIG. 1 is a schematic configuration diagram of a projector including a projection system 3 according to the present disclosure. A projector 1 includes an image formation section 2, which generates a projection image to be projected on a screen S, the projection system 3, which enlarges the projection image and projects the enlarged image on the screen S, and a controller 4, which controls the action of the image formation section 2, as shown in FIG. 1.

Image Generation Optical System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits the B light, which is part of the light rays via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The cross dichroic prism 19 forms part of the projection system 3. The projection system 3 enlarges and projects the projection images (images formed by liquid crystal panels 18R, 18G, and 18B) combined by the cross dichroic prism 19 on the screen S. The screen S is the enlargement-side image formation plane of the projection system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

The projection system 3 will next be described. Examples 1 to 4 will be described below as examples of the configuration of the projection system 3 incorporated in the projector 1. In the light ray diagrams of the projection systems according to Examples 1 to 4, the liquid crystal panels 18R, 18G, and 18B are referred to as liquid crystal panels 18.

Example 1

Figure 2:
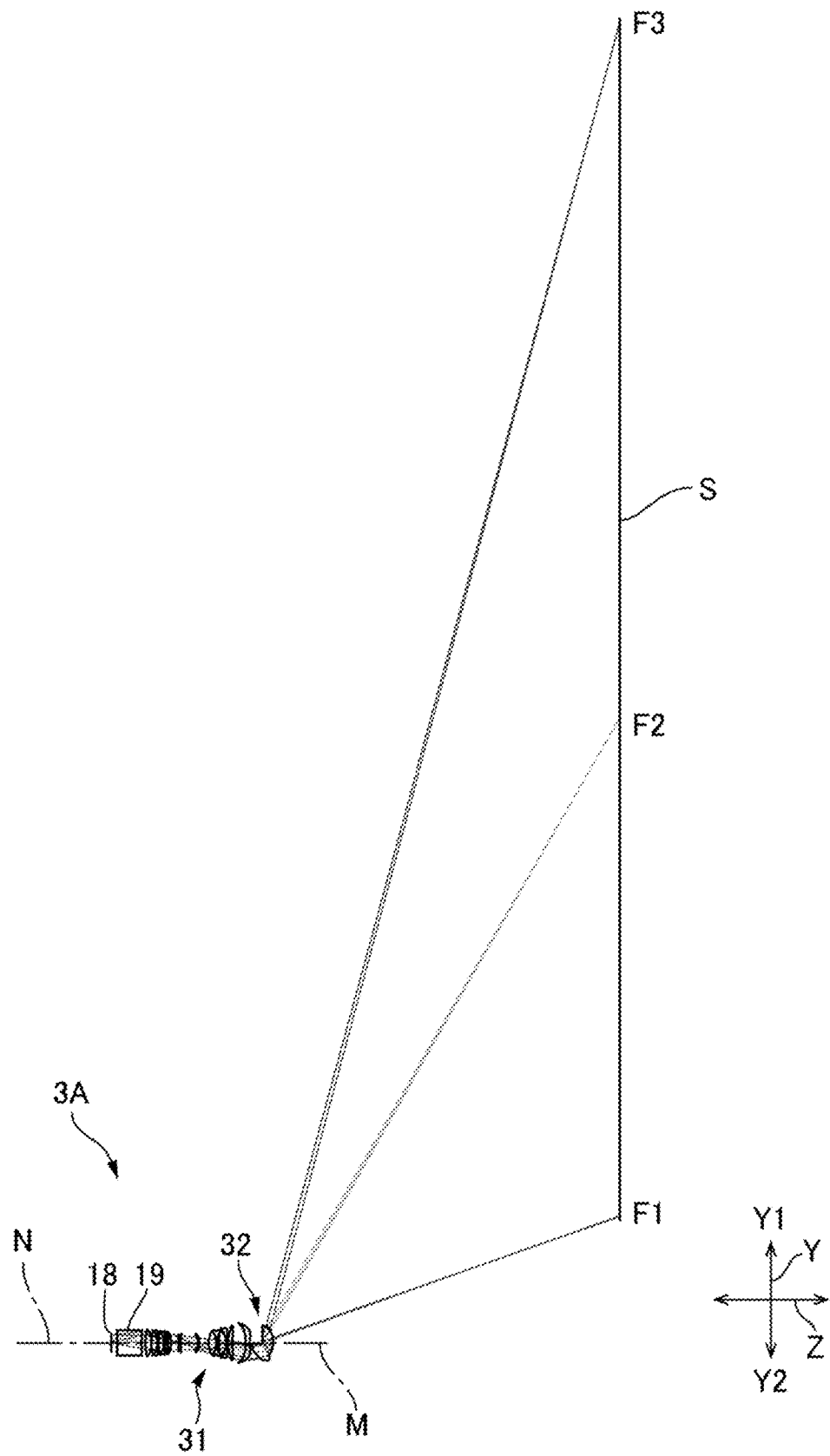
FIG. 2 is a light ray diagram diagrammatically showing the entire projection system according to Example 1.
Figure 3:
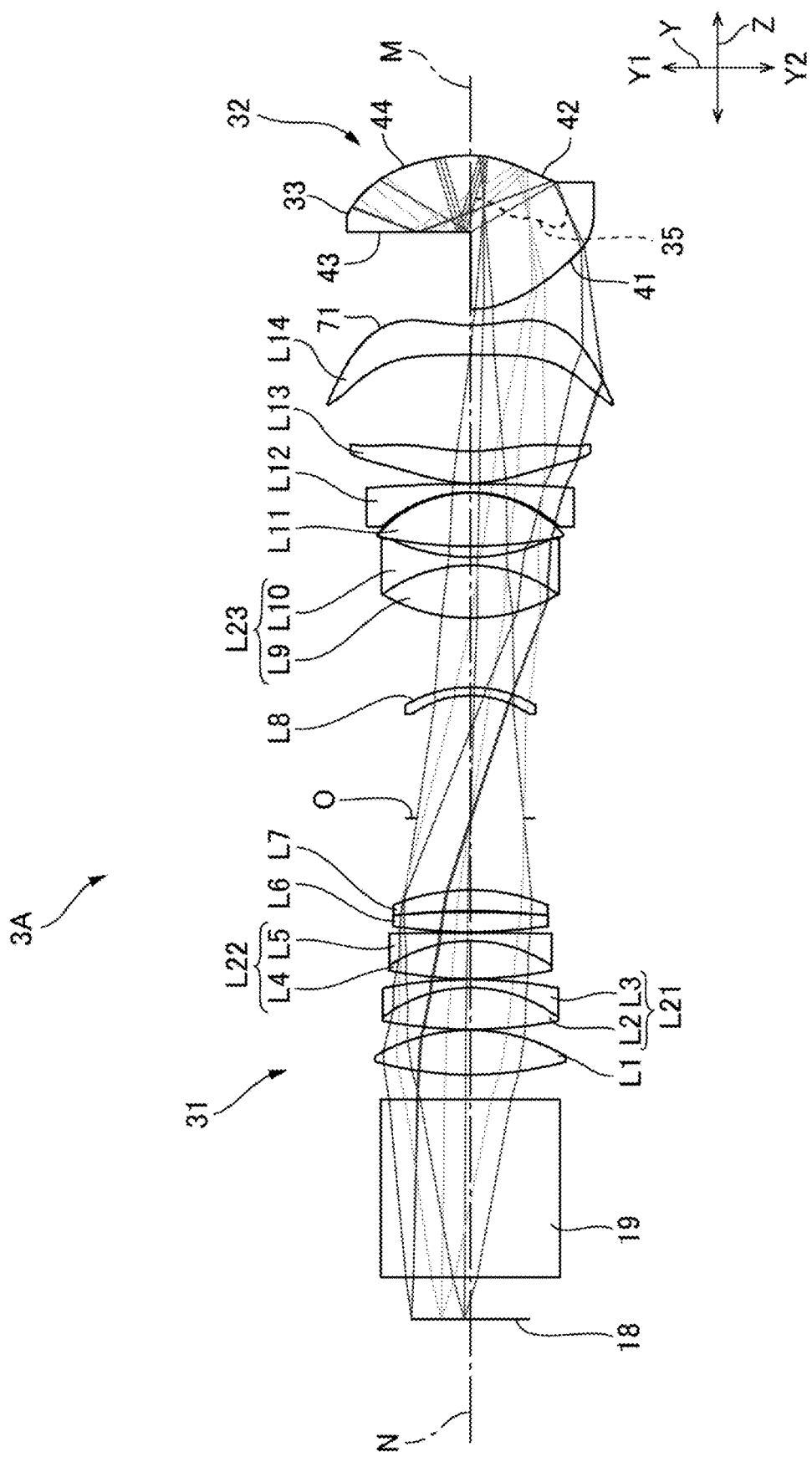
FIG. 3 is a light ray diagram of the projection system according to Example 1.
Figure 4:
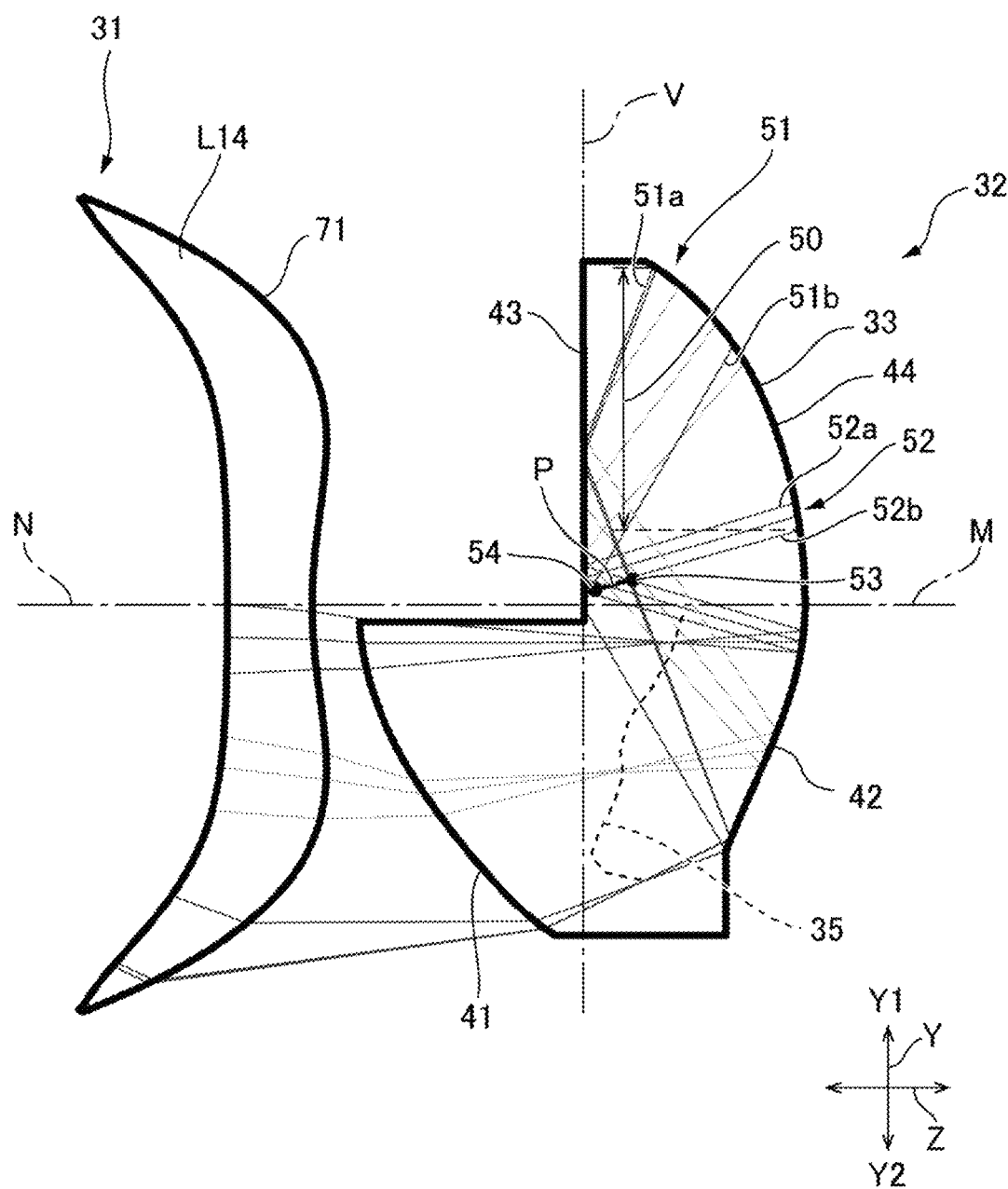
FIG. 4 is a light ray diagram of a second optical system of the projection system according to Example 1.

FIG. 2 is a light ray diagram diagrammatically showing the entirety of a projection system 3A according to Example 1. FIG. 2 diagrammatically shows light fluxes F1 to F3, which exit out of the projection system 3A according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. FIG. 3 is a light ray diagram of the projection system 3A according to Example 1. FIG. 4 is a light ray diagram of a second optical system.

The projection system 3A according to the present example includes a first optical system 31 and a second optical system 32 sequentially arranged from the reduction side toward the enlargement side, as shown in FIG. 3. The first optical system 31 is a refractive optical system including a plurality of lenses. The second optical system 32 is a single optical element 33. The optical element 33 has a first transmissive surface 41, a first reflection surface 42, a second reflection surface 43, and a second transmissive surface 44 arranged from the reduction side in the order of light passage. The first transmissive surface 41 has a convex shape protruding toward the reduction side. The first reflection surface 42 has a concave shape. The second reflection surface 43 has a flat shape. That is, the second reflection surface 43 is a flat mirror. The second transmissive surface 44 has a convex shape protruding toward the enlargement side.

The liquid crystal panels 18 of the image formation section 2 are disposed in the reduction-side image formation plane of the projection system 3A. The liquid crystal panels 18 form the projection images on one side of a first optical axis N of the first optical system 31 in a plane perpendicular to the first optical axis N. The screen S is disposed in the enlargement-side image formation plane of the projection system. An intermediate image 35 conjugate with the reduction-side image formation plane is formed between the first optical system 31 and the first reflection surface 42 of the optical element 33. The intermediate image 35 is conjugate also with the enlargement-side image formation plane. In the present example, the intermediate image 35 is formed inside the optical element 33. That is, the intermediate image 35 is formed between the first transmissive surface 41 and the first reflection surface 42 of the optical element 33. The intermediate image 35 is formed on the side opposite the screen S with respect to the first optical axis N of the first optical system 31.

In the following description, three axes perpendicular to one another are called axes X, Y, and Z for convenience. The width direction of the screen S, which is the enlargement-side image formation plane, is called an axis-X direction, the upward/downward direction of the screen S is called an axis-Y direction, and the direction perpendicular to the screen S is called an axis-Z direction. The plane containing the first optical axis N of the first optical system 31 and a second optical axis M of the first reflection surfaces 42 of the optical element 33 is called a plane YZ.

The first optical axis N of the first optical system 31 extends in the axis-Z direction in the present example. FIGS. 2, 3, and 4 are each a light ray diagram in the plane YZ. The liquid crystal panels 18 form the projection images on an upper side Y1 of the first optical axis N of the first optical system 31. The intermediate image 35 is formed on a lower side Y2 of the first optical axis N of the first optical system 31. The screen S is disposed at the upper side Y1 of the optical axis of the first optical system 31.

The first optical system 31 includes the cross dichroic prism 19 and 14 lenses L1 to L14, as shown in FIG. 3. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The optical element 33 is designed by using the second optical axis M of the first reflection surface 42 as the axis in the design stage. In other words, the second optical axis M is the design-stage optical axis of the first transmissive surface 41, the first reflection surface 42, the second reflection surface 43, and the second transmissive surface 44. The second optical axis M of the first reflection surface 42 coincides with the first optical axis N of the first optical system 31, as shown in FIG. 4. The second optical axis M of the first reflection surface 42 therefore extends along the axis Z. The first transmissive surface 41 and the first reflection surface 42 are located at the lower side Y2 of the second optical axis M. The second reflection surface 43 and the second transmissive surface 44 are located at the upper side Y1 of the second optical axis M. The first transmissive surface 41, the first reflection surface 42, and the second transmissive surface 44 of the optical element 33 are each an aspheric surface.

The second reflection surface 43 is perpendicular to the second optical axis M of the first reflection surface 42. The second reflection surface 43 is located between an enlargement-side first surface 71 of the lens L14 (first lens), which is located in a position closest to the enlargement side in the first optical system 31, and the first reflection surface 42 in the axis-Z direction. In the present example, the second reflection surface 43 is located at the middle of the segment along the second optical axis M between the first transmissive surface 41 and the first reflection surface 42. The second transmissive surface 44 is shifted from the second reflection surface 43 toward the first reflection surface 42 in the axis-Z direction. The first reflection surface 42 is a reflection coating layer provided on the enlargement-side surface of the optical element 33. The second reflection surface 43 is a reflection coating layer provided on a flat surface of the optical element 33 that is the surface located at the upper side Y1 of the first optical axis N of the first optical system 31 and facing the first optical system 31. The aspheric surfaces are each a free-form surface in some cases. Also in this case, the free-form surfaces are designed by using the second optical axis M as the design-stage axis.

A pupil P of the second optical system 32 is located inside the optical element 33. The pupil P of the second optical system 32 in the plane YZ is defined by the line that connects an upper intersection 53, where an upper peripheral light ray 51a of an upper end light flux 51 passing through the axis-Y-direction upper end of an effective light ray range 50 of the second transmissive surface 44 and an upper peripheral light ray 52a of a lower end light flux 52 passing through the axis-Y-direction lower end of the effective light ray range 50 intersect each other in the plane YZ, to a lower intersection 54, where a lower peripheral light ray 51b of the upper end light flux 51 and a lower peripheral light ray 52b of the lower end light flux 52 intersect each other in the plane YZ. The pupil P is formed between the second reflection surface 43 and the second transmissive surface 44. The pupil P inclines with respect to an imaginary vertical line V perpendicular to the second optical axis M of the first reflection surface 42 in the plane YZ.

Lens Data

Data on the lenses of the projection system 3A are listed below. The surfaces of the lenses are numbered sequentially from the reduction side toward the enlargement side. Reference characters are given to the lenses, the first transmissive surface, the first reflection surface, the second reflection surface, and the second transmissive surface. Data labeled with a surface number that does not correspond to any of the lenses, the first transmissive surface, the first reflection surface, the second reflection surface, and the second transmissive surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/ reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.7311 |
| | 2 | Spherical | Infinity | 3.0000 | | Refraction | 9.7594 |
| | 3 | Spherical | Infinity | 0.0000 | | Refraction | 10.1914 |
| | 4 | Spherical | Infinity | 0.0000 | | Refraction | 10.1914 |
| | 5 | Spherical | Infinity | 0.0000 | | Refraction | 10.1914 |
| L1 | 6 | Spherical | 41.7981 | 5.3869 | 454494.8186 | Refraction | 10.3800 |
| | 7 | Spherical | −22.2835 | 0.1000 | | Refraction | 10.4038 |
| L2 | 8 | Spherical | 54.2754 | 5.0410 | 451333.7958 | Refraction | 9.5636 |
| L3 | 9 | Spherical | −17.1845 | 1.0000 | 836974.3715 | Refraction | 9.2343 |
| | 10 | Spherical | −52.9270 | 0.1000 | | Refraction | 9.1678 |
| L4 | 11 | Spherical | 47.9808 | 4.5785 | 449429.8119 | Refraction | 8.8285 |
| L5 | 12 | Spherical | −17.2585 | 1.0000 | 836389.3853 | Refraction | 8.5373 |
| | 13 | Spherical | −421.1997 | 0.1070 | | Refraction | 8.4692 |
| L6 | 14 | Spherical | 63.7304 | 2.3863 | 846663.2378 | Refraction | 8.4268 |
| | 15 | Spherical | −108.4486 | 0.1539 | | Refraction | 8.4135 |

-continued

| Reference character | Surface number | Shape | R | D | Glass material | Refraction/reflection | C |
|---|---|---|---|---|---|---|---|
| L7 | 16 | Spherical | −74.2437 | 2.5285 | 445852.8468 | Refraction | 8.4133 |
|  | 17 | Spherical | −24.0570 | 8.6940 |  | Refraction | 8.3803 |
| O | 18 | Spherical | Infinity | 14.8700 |  | Refraction | 6.3565 |
| L8 | 19 | Spherical | −12.0396 | 1.0000 | 754999.5232 | Refraction | 6.6849 |
|  | 20 | Spherical | −15.1143 | 8.3927 |  | Refraction | 7.0797 |
| L9 | 21 | Spherical | 20.7081 | 6.3849 | 632937.3259 | Refraction | 9.0259 |
| L10 | 22 | Spherical | −17.4743 | 1.0000 | 846630.2381 | Refraction | 9.2980 |
|  | 23 | Spherical | 22.2176 | 1.3175 |  | Refraction | 9.7120 |
| L11 | 24 | Spherical | 51.7320 | 6.4418 | 705847.283 | Refraction | 9.7143 |
|  | 25 | Spherical | −14.8667 | 0.1000 |  | Refraction | 10.1684 |
| L12 | 26 | Spherical | −15.5940 | 1.0000 | 754950.5233 | Refraction | 10.1267 |
|  | 27 | Spherical | −164.6925 | 0.1000 |  | Refraction | 11.3760 |
| L13 | 28 | Aspheric | 15.7262 | 3.8897 | E48R_ZEON | Refraction | 13.0487 |
|  | 29 | Aspheric | 21.7673 | 11.6983 |  | Refraction | 13.2604 |
| L14 | 30 | Aspheric | −162.8890 | 3.5584 | E48R_ZEON | Refraction | 15.2088 |
|  | 31 | Aspheric | 19.2386 | 1.9369 |  | Refraction | 15.9296 |
|  | 32 | Spherical | Infinity | 0.0000 |  | Refraction | 14.7153 |
| 41 | 33 | Aspheric | 11.4271 | 18.6477 | Z330R_ZEON | Refraction | 13.6440 |
|  | 34 | Spherical | Infinity | 0.0000 | Z330R_ZEON | Refraction | 9.1508 |
| 42 | 35 | Aspheric | −10.9153 | 0.0000 | Z330R_ZEON | Reflection | 10.3679 |
|  | 36 | Spherical | Infinity | −9.3261 | Z330R_ZEON | Refraction | 17.9355 |
| 43 | 37 | Spherical | Infinity | 0.0000 | Z330R_ZEON | Reflection | 10.2826 |
|  | 38 | Spherical | Infinity | 9.3261 | Z330R_ZEON | Refraction | 10.2826 |
| 44 | 39 | Aspheric | −22.7753 | 65.8130 |  | Refraction | 14.8869 |
|  | 40 | Spherical | Infinity | 56.8385 |  | Refraction | 283.7433 |
|  | 41 | Spherical | Infinity | 180.0883 |  | Refraction | 496.0674 |
| S | 42 | Spherical | Infinity | 0.0000 |  | Refraction | 1169.4532 |

The aspheric coefficients of each of the aspheric surfaces are listed below.

| Surface number | S28 | S29 | S30 | S31 |
|---|---|---|---|---|
| Radius of curvature in axis-Y direction | 15.72616326 | 21.7672795 | −162.8889779 | 19.23858641 |
| Conic constant (k) | −0.34070695 | −7.775047152 | 90 | 0 |
| Fourth-order coefficient (A) | −1.44445E−04 | −1.26419E−04 | −4.65331E−05 | −3.29684E−04 |
| Sixth-order coefficient (B) | 8.97377E−08 | 5.74077E−08 | −4.32930E−07 | 5.68427E−07 |
| Eighth-order coefficient (C) | 6.20294E−10 | 1.51258E−09 | 1.40636E−09 | −8.11882E−10 |
| Tenth-order coefficient (D) |  |  |  |  |
| Twelfth-order coefficient (E) |  |  |  |  |

| Surface number | S33 | S35 | S39 |
|---|---|---|---|
| Radius of curvature in axis-Y direction | 11.42713731 | −10.91528586 | −22.77526913 |
| Conic constant (k) | −0.407326241 | −3.984142888 | 1.077443753 |
| Fourth-order coefficient (A) | −4.02438E−05 | −6.19674E−05 | 1.78454E−05 |
| Sixth-order coefficient (B) | −4.67907E−07 | 8.46203E−07 | −1.11659E−07 |
| Eighth-order coefficient (C) | 1.27376E−09 | −2.18754E−09 | −4.18094E−10 |
| Tenth-order coefficient (D) | −4.47766E−12 | 2.01334E−12 | 4.22966E−12 |
| Twelfth-order coefficient (E) | −5.64150E−16 |  | −9.89579E−15 |

A maximum object height, the numerical aperture, a mirror radius, a lens overall length, and TR of the projection system 3A are as follows: The maximum object height is the dimension from the first optical axis N of the projection system 3A to the farthest point therefrom in an image formation region of the surface of each of the liquid crystal panels 18. The maximum object height is expressed in millimeters. The numerical aperture is abbreviated to NA. The mirror radius is the radius of the first reflection surface in millimeters. The final lens radius is the lens radius of the second transmissive surface in millimeters. The lens overall length of the projection system 3A is the distance in millimeters from the liquid crystal panels 18 to the second transmissive surface in the axis-Z direction. TR stands for a throw ratio and is the quotient of the operation of dividing the projection distance by the axis-X-direction dimension of a projection image projected on the screen S.

| Maximum object height | 7.0 |
|---|---|
| NA | 0.2742 |
| Mirror radius | 10.4 |
| Final lens radius | 14.9 |
| Lens overall length | 141 |
| TR (0.37" 16:9) | 0.22 |

Effects and Advantages

The projection system 3A according to the present example includes the first optical system 31 and the second optical system 32 sequentially arranged from the reduction side toward the enlargement side. The second optical system 32 includes the optical element 33 having the first transmissive surface 41, the first reflection surface 42, the second reflection surface 43, and the second transmissive surface 44 arranged sequentially from the reduction side. The second reflection surface 43 is located between the enlargement-side first surface 71 of the lens L14, which is located in a position closest to the enlargement side in the first optical system 31, and the first reflection surface 42 in the axis-Z direction along the first optical axis N of the first optical system 31. Further, the second transmissive surface 44 is located at the side opposite the side where the first optical system 31 is located with respect to the second reflection surface 43 in the axis-Z direction along the first optical axis N of the first optical system 31.

In the projection system 3A according to the present example, the second transmissive surface 44 can refract the light flux reflected off the first reflection surface 42 in the second optical system 32. The projection distance of the projection system is therefore readily shortened as compared with a case where the second optical system has only the first reflection surface. In other words, the projection system 3A according to the present example can have a short focal length as compared with the case where the second optical system has only the first reflection surface.

The projection system 3A according to the present example, which includes the second reflection surface 43, can output the light flux having exited out of the second optical system 32 toward the side opposite the first optical system 31 in the axis-Z direction. The light flux that exits out of the second optical system 32 is therefore readily oriented in a direction in which the light flux does not interfere with the first optical system 31.

Further, in the present example, in which the single optical element 33 has the first reflection surface 42 and the second reflection surface 43, the second optical system. 32 can be compact even when the two reflection surfaces are provided inside the second optical system 32.

In the present example, the optical element 33 has the convex second transmissive surface 44 protruding toward the enlargement side, whereby an increase in the size of the first reflection surface 42, which is disposed at the enlargement side of the intermediate image 35, can be readily suppressed even when the projection distance is shortened. That is, the second transmissive surface 44 can refract the light flux and can therefore suppress inclination of the intermediate image 35, which is conjugate with the screen S, with respect to the second optical axis M of the first reflection surface 42 and the resultant increase in the size of the intermediate image 35. An increase in the size of the first reflection surface 42, which is located at the enlargement side of the intermediate image 35, can therefore be suppressed.

Further, in the present example, the intermediate image 35 is located between the first transmissive surface 41 and the first reflection surface 42 of the optical element 33. The first optical system and the optical element are therefore allowed to approach each other as compared with a case where the intermediate image is formed between the first optical system and the optical element. The projection system can therefore be compact.

The pupil P of the second optical system 32 inclines with respect to the imaginary vertical line V perpendicular to the second optical axis M of the first reflection surface 42. A decrease in the amount of light at a periphery of the screen S that is the periphery on the upper side Y1 can therefore be suppressed as compared with a case where the pupil P of the second optical system 32 is parallel to the imaginary vertical line V. That is, in the configuration in which the pupil P inclines with respect to the imaginary vertical line V perpendicular to the second optical axis M, the amount of light flux F1, which reaches the upper portion of the screen S, increases as compared with the case where the pupil P is parallel to the imaginary vertical line V. Further, when the amount of light flux F1, which reaches the upper portion of the screen S, increases, the difference in the amount of light between the light flux F1 and the light flux F3, which reaches the lower portion of the screen S decreases. A decrease in the amount of light at the upper periphery of the screen S as compared with that at the lower periphery of the screen S can therefore be suppressed.

In the optical element 33 in the present example, the first transmissive surface 41, which is located at the reduction side of the intermediate image 35, is an aspheric surface, whereby occurrence of aberrations at the intermediate image 35 is readily suppressed. The first reflection surface 42 and the second transmissive surface 44 of the optical element are also each an aspheric surface. Occurrence of aberrations is therefore readily suppressed in the enlargement-side image formation plane.

Figure 5:
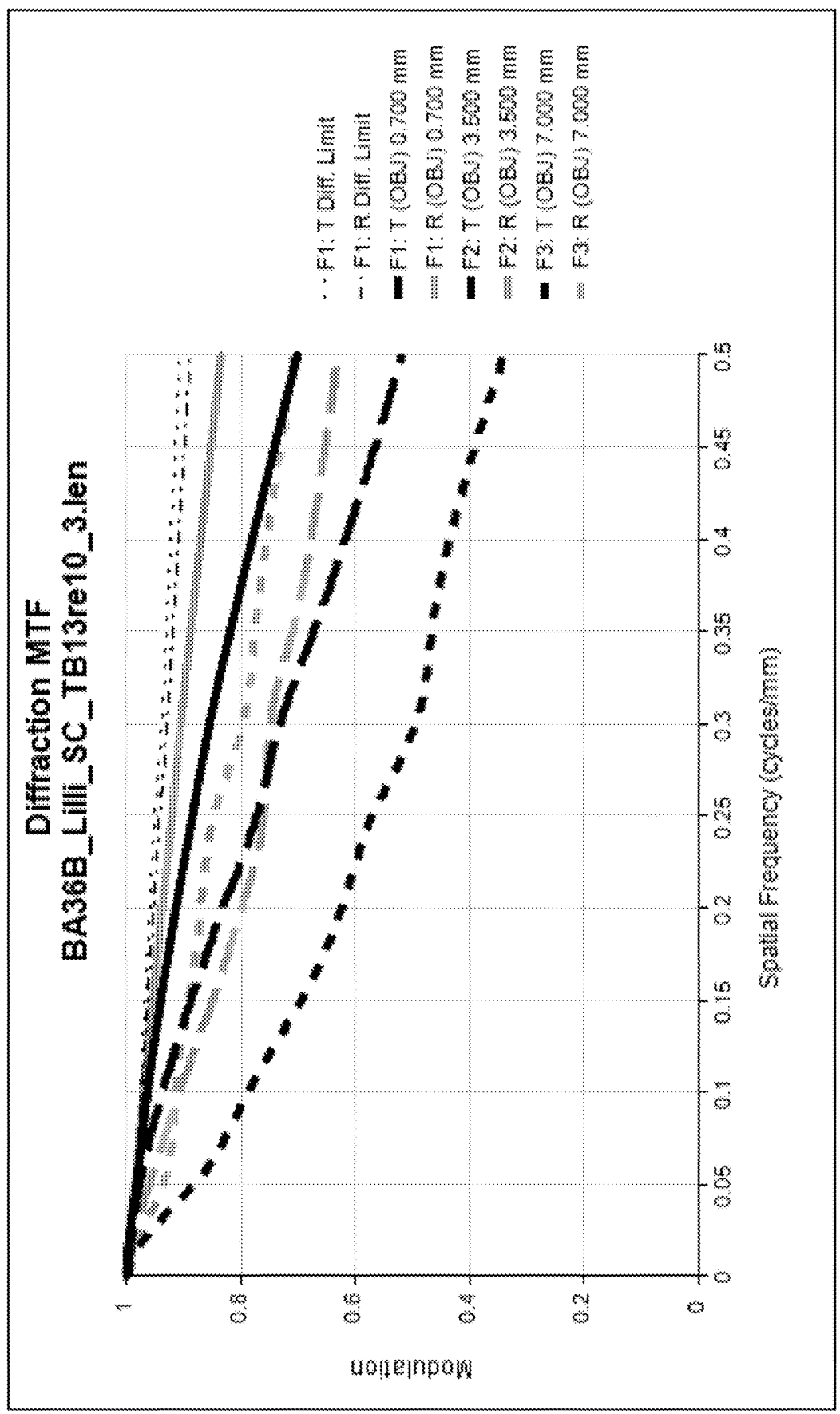
FIG. 5 shows the enlargement-side MTF of the projection system according to Example 1.

FIG. 5 shows the enlargement-side MTF of the projection system 3A. The horizontal axis of FIG. 5, which shows the MTF, represents the spatial frequency. The vertical axis of FIG. 5 represents a contrast reproduction ratio. In FIG. 5, the black graphs represent tangential light rays (T), and the gray graphs represent radial light rays (R). Out of the tangential light rays (T) and the radial light rays (R), the solid lines represent the light flux F1, the long-interval broken lines represent the light flux F2, and the broken lines represent the light flux F3. The projection system 3A according to the present example provides high resolution, as shown in FIG. 5.

Example 2

Figure 6:
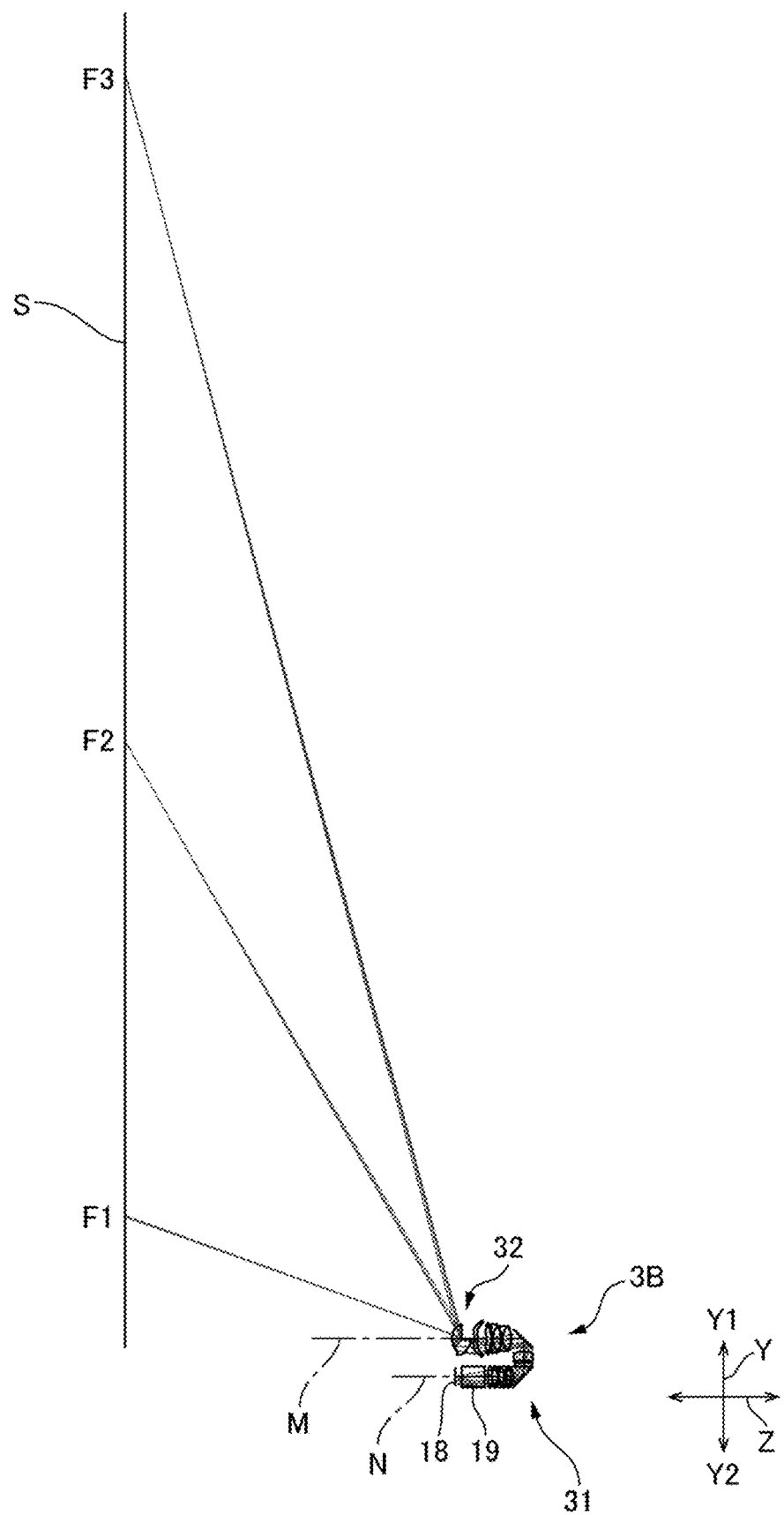
FIG. 6 is a light ray diagram diagrammatically showing the entire projection system according to Example 2.
Figure 7:
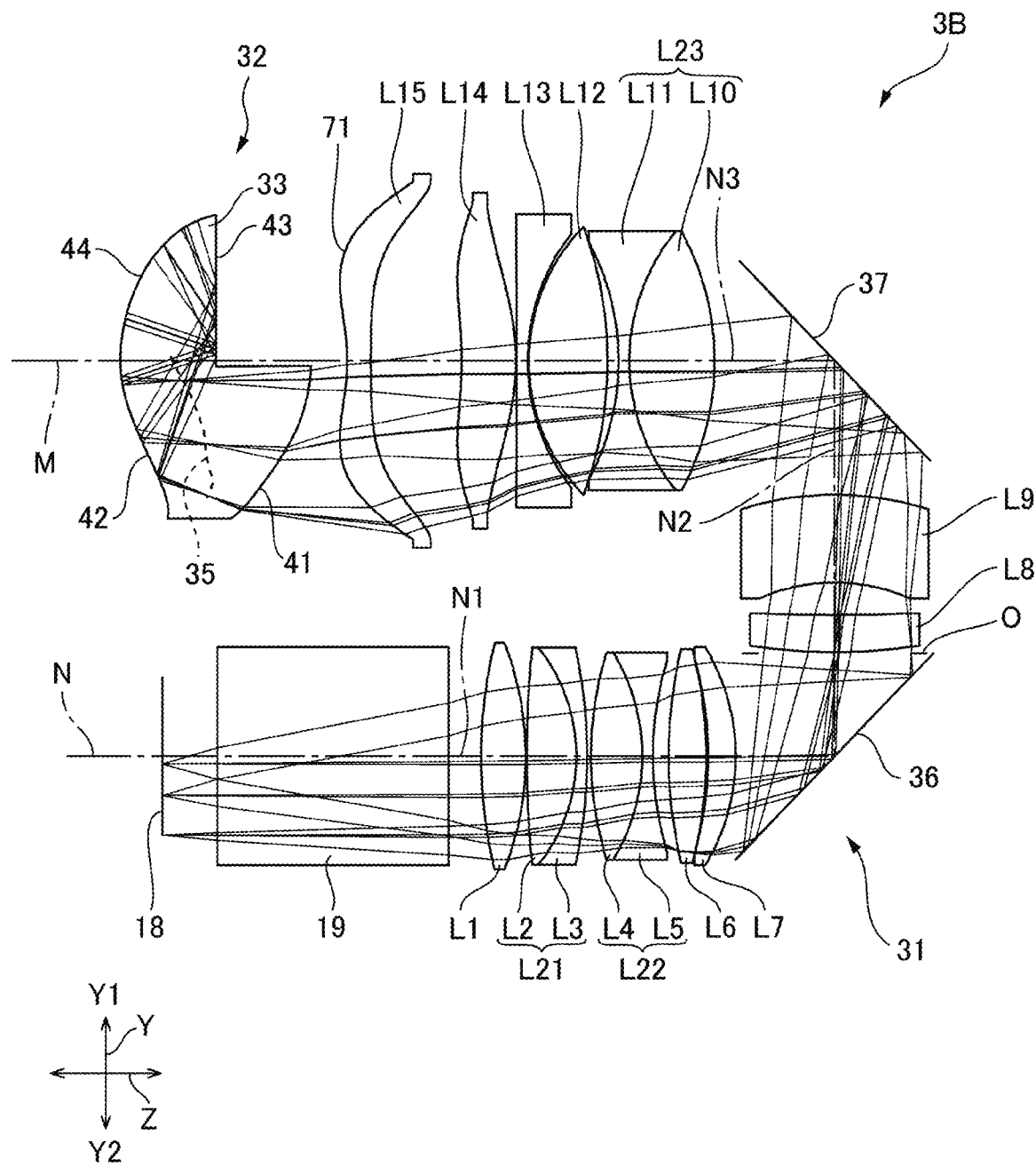
FIG. 7 is a light ray diagram of the projection system according to Example 2.
Figure 8:
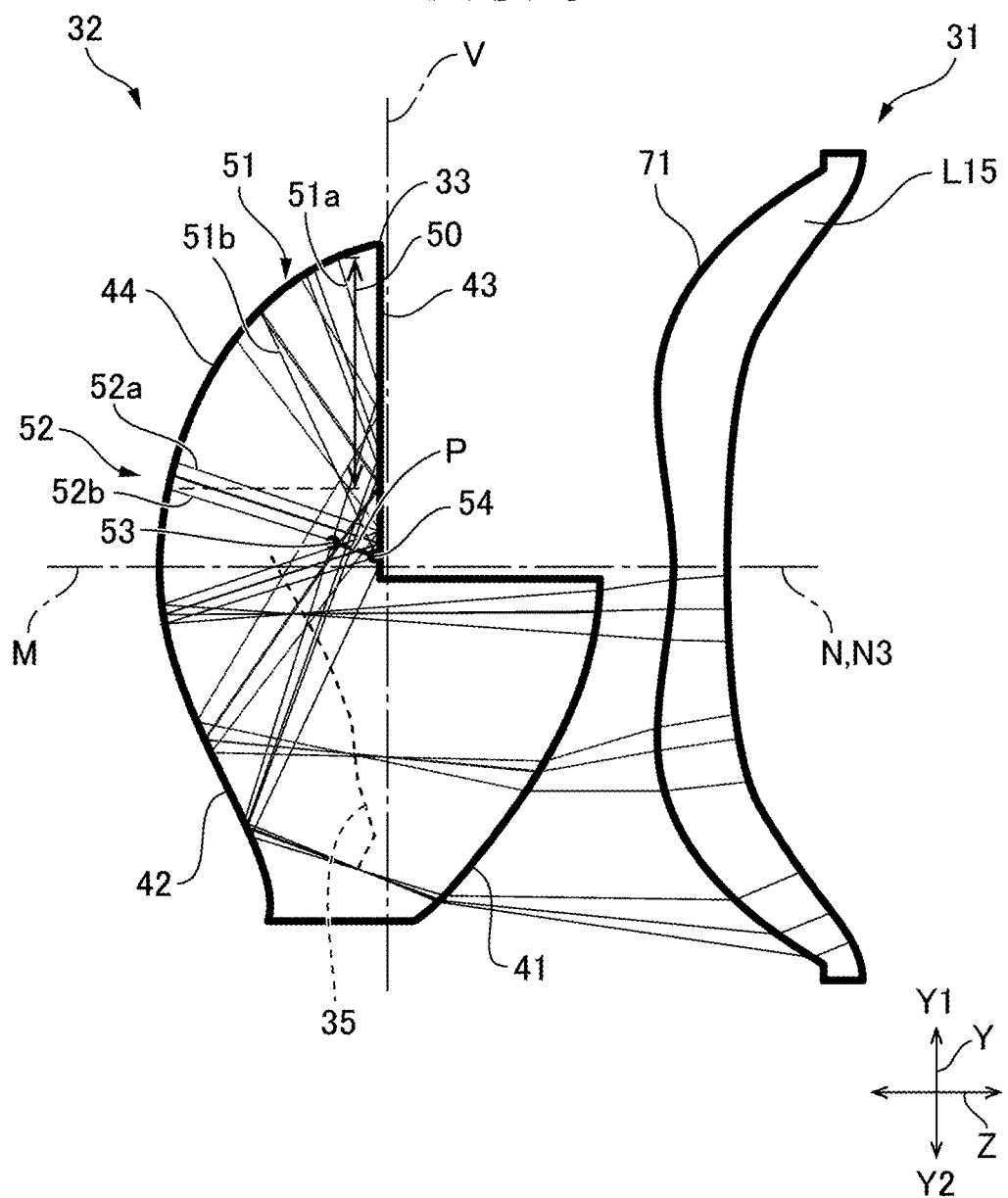
FIG. 8 is a light ray diagram of the second optical system of the projection system according to Example 2.

FIG. 6 is a light ray diagram diagrammatically showing the entire projection system according to Example 2. FIG. 6 diagrammatically shows the light fluxes F1 to F3, which exit out of a projection system 3B according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. FIG. 7 is a light ray diagram of the projection system 3B according to Example 2. FIG. 8 is a light ray diagram of the second optical system in Example 2.

The projection system according to Example 2 is based on the projection system according to Example 1, and the first optical system in Example 2 includes first and second deflectors that deflect the optical path of the first optical system. The projection system 3B according to the present example includes the first optical system 31 and the second optical system 32 sequentially arranged from the reduction side toward the enlargement side, as shown in FIG. 6. The first optical system 31 is a refractive optical system including a plurality of lenses. The second optical system 32 is the single optical element 33. The optical element 33 has the first transmissive surface 41, the first reflection surface 42, the second reflection surface 43, and the second transmissive surface 44 arranged from the reduction side in the order of light passage. The first transmissive surface 41 has a convex shape protruding toward the reduction side. The first reflection surface 42 has a concave shape. The second reflection surface 43 has a flat shape. That is, the second reflection surface 43 is a flat mirror. The second transmissive surface 44 has a convex shape protruding toward the enlargement side.

The liquid crystal panels 18 of the image formation section 2 are disposed in the reduction-side image formation plane of the projection system 3B. The liquid crystal panels 18 form the projection images on one side of the first optical axis N of the first optical system 31 in a plane perpendicular to the first optical axis N. The screen S is disposed in the enlargement-side image formation plane of the projection system. The intermediate image 35 conjugate with the reduction-side image formation plane is formed between the first optical system 31 and the first reflection surface 42 of the optical element 33. The intermediate image 35 is conjugate also with the enlargement-side image formation plane. In the present example, the intermediate image 35 is formed inside the optical element 33. That is, the intermediate image 35 is formed between the first transmissive surface 41 and the first reflection surface 42 of the optical element 33. The intermediate image 35 is formed on the side opposite the screen S with respect to the first optical axis N of the first optical system 31.

The first optical axis N of the first optical system 31 extends in the axis-Z direction in the present example. FIGS. 6, 7, and 8 are each a light ray diagram in the plane YZ. The liquid crystal panels 18 form the projection images on the upper side Y1 of the first optical axis N of the first optical system 31. The intermediate image 35 is formed on the lower side Y2 of the first optical axis N of the first optical system 31. The screen S is disposed at the upper side Y1 of the optical axis of the first optical system.

The first optical system 31 includes the cross dichroic prism 19 and 15 lenses L1 to L15, as shown in FIG. 7. The lenses L1 to L15 are arranged in the presented order from the reduction side toward the enlargement side. In the present example, the lenses L2 and L3 are bonded to each other into the first doublet L21. The lenses L4 and L5 are bonded to each other into the second doublet L22. The lenses L10 and L11 are bonded to each other into the third doublet L23. The aperture O is disposed between the lens L7 and the lens L8.

The first optical system 31 includes a first deflector 36 and a second deflector 37, which deflect the optical path of the first optical system 31. The first deflector 36 and the second deflector 37 are each a flat mirror. The first deflector 36 is disposed adjacent to and on the reduction side of the aperture O. That is, the first deflector 36 is disposed between the lens L7 and the aperture O. The second deflector 37 is shifted from the aperture O toward the enlargement side. That is, the second deflector 37 is disposed between the lens L9 and the lens L10. The first optical axis N of the first optical system 31 is divided into a first section N1 of the first optical axis that is the section at the reduction side of the first deflector 36, a second section N2 of the first optical axis that is the section at the enlargement side of the first deflector 36 but up to the second deflector 37, and a third section N3 of the first optical axis that is the section at the enlargement side of the second deflector 37, and the angle between the first section N1 of the first optical axis and the second section N2 of the first optical axis is 90°. The angle between the second section N2 of the first optical axis and the third section N3 of the first optical axis is 90°. The first section N1 of the first optical axis and the third section N3 of the first optical axis are parallel to each other. In the present example, the first section N1 of the first optical axis and the third section N3 of the first optical axis extend in parallel to each other.

That is, the first deflector 36 is so disposed as to incline by 45° with respect to the first section N1 of the first optical axis and deflects the light path of the first optical system 31 by 90° toward the upper side Y1. The second deflector 37 is so disposed as to incline by 45° with respect to the second section N2 of the first optical axis and deflects back the light path of the first optical system 31 by 180°.

The optical element 33 is designed by using the second optical axis M of the first reflection surface 42 as the axis in the design stage. The second optical axis M is the design-stage optical axis of the first transmissive surface 41, the first reflection surface 42, the second reflection surface 43, and the second transmissive surface 44. The second optical axis M of the first reflection surface 42 coincides with the third section N3 of the first optical axis N of the first optical system 31, as shown in FIG. 7. The second optical axis M of the first reflection surface 42 therefore extends along the axis Z. The first transmissive surface 41 and the first reflection surface 42 are located at the lower side Y2 of the second optical axis M. The second reflection surface 43 and the second transmissive surface 44 are located at the upper side Y1 of the second optical axis M. The first transmissive surface 41, the first reflection surface 42, and the second transmissive surface 44 of the optical element 33 are each an aspheric surface.

The second reflection surface 43 is perpendicular to the second optical axis M of the first reflection surface 42. The second reflection surface 43 is located between the enlargement-side first surface 71 of the lens L15 (first lens), which is located in a position closest to the enlargement side in the first optical system 31, and the first reflection surface 42 in the axis-Z direction. The second transmissive surface 44 is shifted from the second reflection surface 43 toward the first reflection surface 42 in the axis-Z direction. In the present example, the second reflection surface 43 is located at the middle of the segment along the second optical axis M between the first transmissive surface 41 and the first reflection surface 42. The first reflection surface 42 and the second reflection surface 43 are each formed of a reflection coating layer provided on the optical element.

The pupil P of the second optical system 32 is located inside the optical element 33. The pupil P of the second optical system 32 in the plane YZ is defined by the line that connects the upper intersection 53, where the upper peripheral light ray 51a of the upper end light flux 51 passing through the axis-Y-direction upper end of the effective light ray range of the second transmissive surface 44 and the upper peripheral light ray 52*a* of the lower end light flux 52 passing through the axis-Y-direction lower end of the effective light ray range 50 intersect each other in the plane YZ, to the lower intersection 54, where the lower peripheral light ray 51*b* of the upper end light flux 51 and the lower peripheral light ray 52*b* of the lower end light flux 52 intersect each other in the plane YZ. The pupil P is formed between the second reflection surface 43 and the second transmissive surface 44. The pupil P inclines with respect to the imaginary vertical line V perpendicular to the second optical axis M of the first reflection surface 42 in the plane YZ.

Lens Data

Data on the lenses of the projection system 3B are listed below. The surfaces of the lenses are numbered sequentially from the reduction side toward the enlargement side. Reference characters are given to the lenses, the first deflector, the second deflector, the first transmissive surface, the first reflection surface, the second reflection surface, and the second transmissive surface. Data labeled with a surface number that does not correspond to any of the lenses, the first deflector, the second deflector, the first transmissive surface, the first reflection surface, the second reflection surface, and the second transmissive surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/ reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.4708 |
| | 2 | Spherical | Infinity | 3.0000 | | Refraction | 8.7816 |
| | 3 | Spherical | Infinity | 0.0000 | | Refraction | 9.0598 |
| | 4 | Spherical | Infinity | 0.0000 | | Refraction | 9.0598 |
| | 5 | Spherical | Infinity | 0.0000 | | Refraction | 9.0598 |
| L1 | 6 | Spherical | 41.3496 | 4.1237 | 446651.8387 | Refraction | 9.1550 |
| | 7 | Spherical | −26.9374 | 0.1000 | | Refraction | 9.1443 |
| L2 | 8 | Spherical | 89.6635 | 4.5978 | 446750.8377 | Refraction | 8.7601 |
| L3 | 9 | Spherical | −14.9472 | 1.0000 | 840356.3106 | Refraction | 8.5284 |
| | 10 | Spherical | −43.6281 | 0.3597 | | Refraction | 8.6292 |
| L4 | 11 | Spherical | 29.8223 | 4.7512 | 446800.8372 | Refraction | 8.3726 |
| L5 | 12 | Spherical | −17.1008 | 1.0000 | 840969.3016 | Refraction | 8.1291 |
| | 13 | Spherical | 28.4021 | 1.4530 | | Reflection | 8.1133 |
| L6 | 14 | Spherical | 39.1659 | 3.4875 | 844039.2384 | Reflection | 8.4268 |
| | 15 | Spherical | −35.3277 | 0.1648 | | Reflection | 8.6257 |
| L7 | 16 | Spherical | −30.8256 | 2.5591 | 446338.8419 | Reflection | 8.6258 |
| | 17 | Spherical | −18.0277 | 9.1800 | | Refraction | 8.7935 |
| 36 | 18 | Spherical | Infinity | 0.0000 | | Reflection | 12.0764 |
| O | 19 | Spherical | Infinity | −9.1465 | | Refraction | 7.7989 |
| | 20 | Spherical | Infinity | −0.1000 | | Refraction | 7.0058 |
| L8 | 21 | Spherical | −53.7469 | −3.2787 | 846663.2378 | Refraction | 7.1341 |
| | 22 | Spherical | −144.6175 | −2.8947 | | Refraction | 7.1246 |
| L9 | 23 | Spherical | 18.1268 | −7.7925 | 437001.951 | Refraction | 7.1697 |
| | 24 | Spherical | 29.7047 | −11.8968 | | Refraction | 8.4056 |
| 37 | 25 | Spherical | Infinity | 0.0000 | | Reflection | 12.4527 |
| | 26 | Spherical | Infinity | 11.1365 | | Refraction | 9.6230 |
| L10 | 27 | Spherical | 23.0802 | 7.8965 | 654825.3106 | Refraction | 10.9116 |
| L11 | 28 | Spherical | −17.4354 | 1.0000 | 846622.2382 | Refraction | 10.7166 |
| | 29 | Spherical | 21.4510 | 1.0262 | | Refraction | 10.5247 |
| L12 | 30 | Spherical | 32.8585 | 7.2937 | 624493.3325 | Refraction | 10.5222 |
| | 31 | Spherical | −16.5063 | 0.1000 | | Refraction | 10.8679 |
| L13 | 32 | Spherical | −17.7085 | 1.0000 | 834805.4272 | Refraction | 10.7882 |
| | 33 | Spherical | 813.6714 | 0.1000 | | Refraction | 12.0073 |
| L14 | 34 | Aspheric | 19.6512 | 5.0554 | E48R_ZEON | Refraction | 13.4091 |
| | 35 | Aspheric | 34.5313 | 8.4068 | | Refraction | 13.7758 |
| L15 | 36 | Aspheric | −164.5336 | 2.1887 | E48R_ZEON | Refraction | 14.7352 |
| | 37 | Aspheric | 17.2276 | 3.3469 | | Refraction | 15.4006 |
| | 38 | Spherical | Infinity | 0.0000 | | Refraction | 14.1562 |
| 41 | 39 | Aspheric | 14.4228 | 17.7240 | Z330R_ZEON | Refraction | 13.2267 |
| | 40 | Spherical | Infinity | 0.0000 | Z330R_ZEON | Refraction | 9.5197 |
| 42 | 41 | Aspheric | −10.7312 | 0.0000 | Z330R_ZEON | Reflection | 14.0000 |
| | 42 | Spherical | Infinity | −8.8620 | Z330R_ZEON | Refraction | 20.7085 |
| 43 | 43 | Spherical | Infinity | 0.0000 | Z330R_ZEON | Reflection | 11.2439 |
| | 44 | Spherical | Infinity | 8.8620 | Z330R_ZEON | Refraction | 11.2439 |
| 44 | 45 | Aspheric | −14.7968 | 65.8130 | | Refraction | 12.8655 |
| | 46 | Spherical | Infinity | 56.8385 | | Refraction | 284.6883 |
| | 47 | Spherical | Infinity | 180.0883 | | Refraction | 496.7180 |
| S | 48 | Spherical | Infinity | 0.0000 | | Refraction | 1169.3933 |

The aspheric coefficients of each of the aspheric surfaces are listed below.

| Surface number | S34 | S35 | S36 | S37 |
|---|---|---|---|---|
| Radius of curvature in axis-Y direction | 19.65123164 | 34.5312867 | −164.5336138 | 17.22758865 |
| Conic constant (k) | −0.333991433 | −11.96552678 | 90 | 0 |
| Fourth-order coefficient (A) | −8.71972E−05 | −1.25254E−04 | −1.01206E−04 | −3.66229E−04 |
| Sixth-order coefficient (B) | 8.53981E−08 | 9.52603E−08 | −3.26852E−07 | 6.33006E−07 |
| Eighth-order coefficient (C) | −5.25436E−11 | 6.50366E−10 | 1.78778E−09 | −8.64204E−10 |
| Tenth-order coefficient (D) | | | | |
| Twelfth-order coefficient (E) | | | | |

| Surface number | S39 | S41 | S45 |
|---|---|---|---|
| Radius of curvature in axis-Y direction | 14.42275259 | −10.73124706 | −14.79675506 |
| Conic constant (k) | −0.645055449 | −4.75889166 | 0.254686622 |
| Fourth-order coefficient (A) | 1.36567E−04 | −1.33100E−04 | 5.41180E−05 |
| Sixth-order coefficient (B) | −2.55668E−06 | 1.56580E−06 | −3.37407E−08 |
| Eighth-order coefficient (C) | 2.31755E−08 | −7.35602E−09 | −2.99909E−09 |
| Tenth-order coefficient (D) | −1.17497E−10 | 1.63491E−11 | 2.13109E−11 |
| Twelfth-order coefficient (E) | 2.43317E−13 | | −4.63800E−14 |

The maximum object height, the numerical aperture, the mirror radius, the lens overall length, and TR of the projection system 3B are as follows: The maximum object height is the dimension from the first optical axis N of the projection system 3B to the farthest point therefrom in the image formation region of the surface of each of the liquid crystal panels 18. The maximum object height is expressed in millimeters. The numerical aperture is abbreviated to NA. The mirror radius is the radius of the first reflection surface in millimeters. The final lens radius is the lens radius of the second transmissive surface in millimeters. The lens overall length of the projection system 3B is the distance in millimeters from the liquid crystal panels 18 to the second transmissive surface in the axis-Z direction. TR stands for the throw ratio and is the quotient of the operation of dividing the projection distance by the axis-X-direction dimension of a projection image projected on the screen S.

| | |
|---|---|
| Maximum object height | 7.0 |
| NA | 0.2742 |
| Mirror radius | 14.0 |
| Final lens radius | 12.9 |
| Lens overall length | 164 |
| TR (0.37" 16:9) | 0.22 |

Effects and Advantages

The projection system according to the present example can provide the same effects and advantages as those provided by the projection system according to Example 1. In the present example, in which the first and second deflectors are provided, the optical path of the first optical system is deflected back. The area occupied by the first optical system can therefore be reduced when viewed along the axis-Y direction, that is, when taken along the plane XZ.

Figure 9:
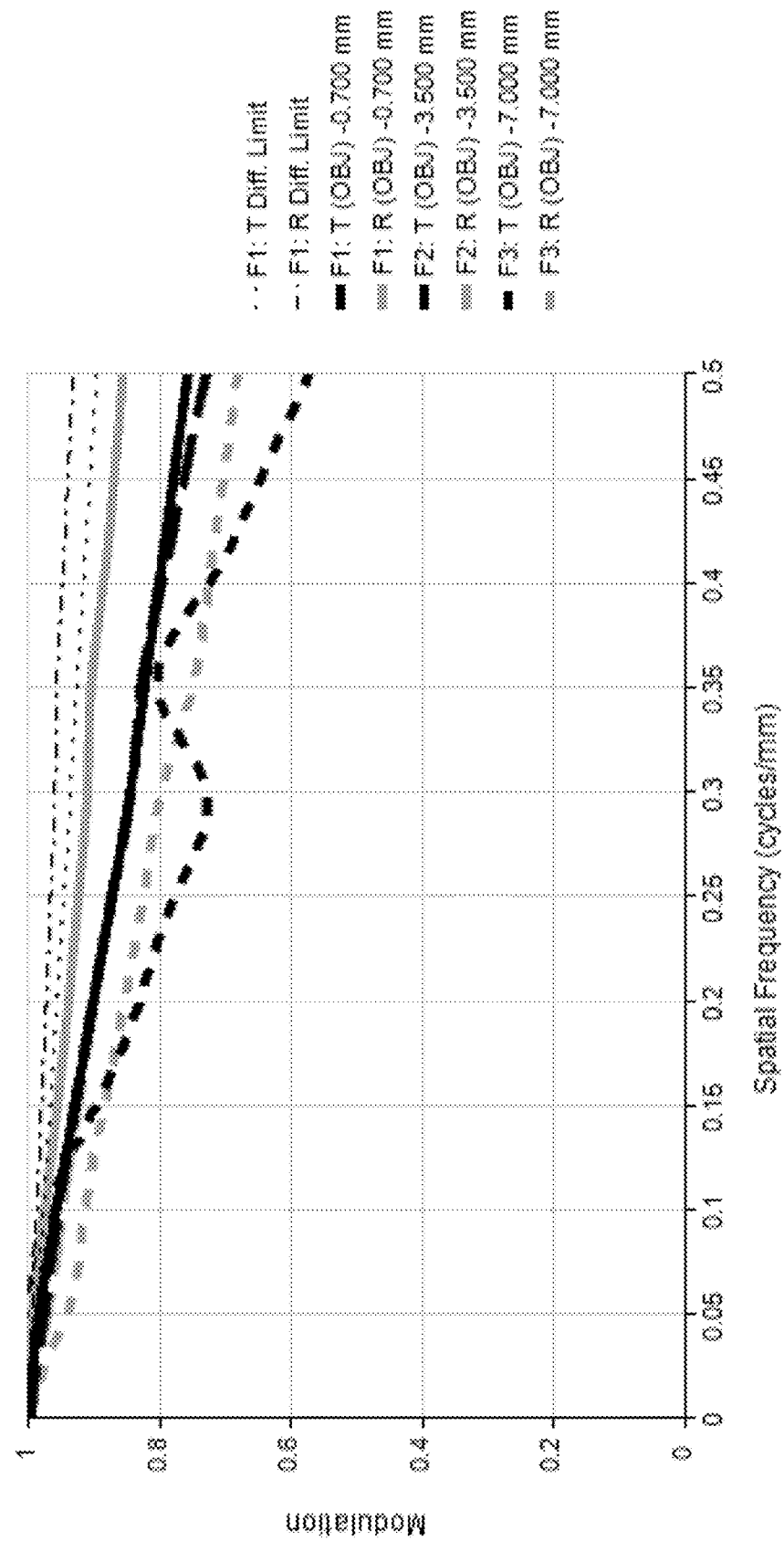
FIG. 9 shows the enlargement-side MTF of the projection system according to Example 2.

FIG. 9 shows the enlargement-side MTF of the projection system 3B. The projection system 3B according to the present example provides high resolution, as shown in FIG. 9.

Example 3

Figure 10:
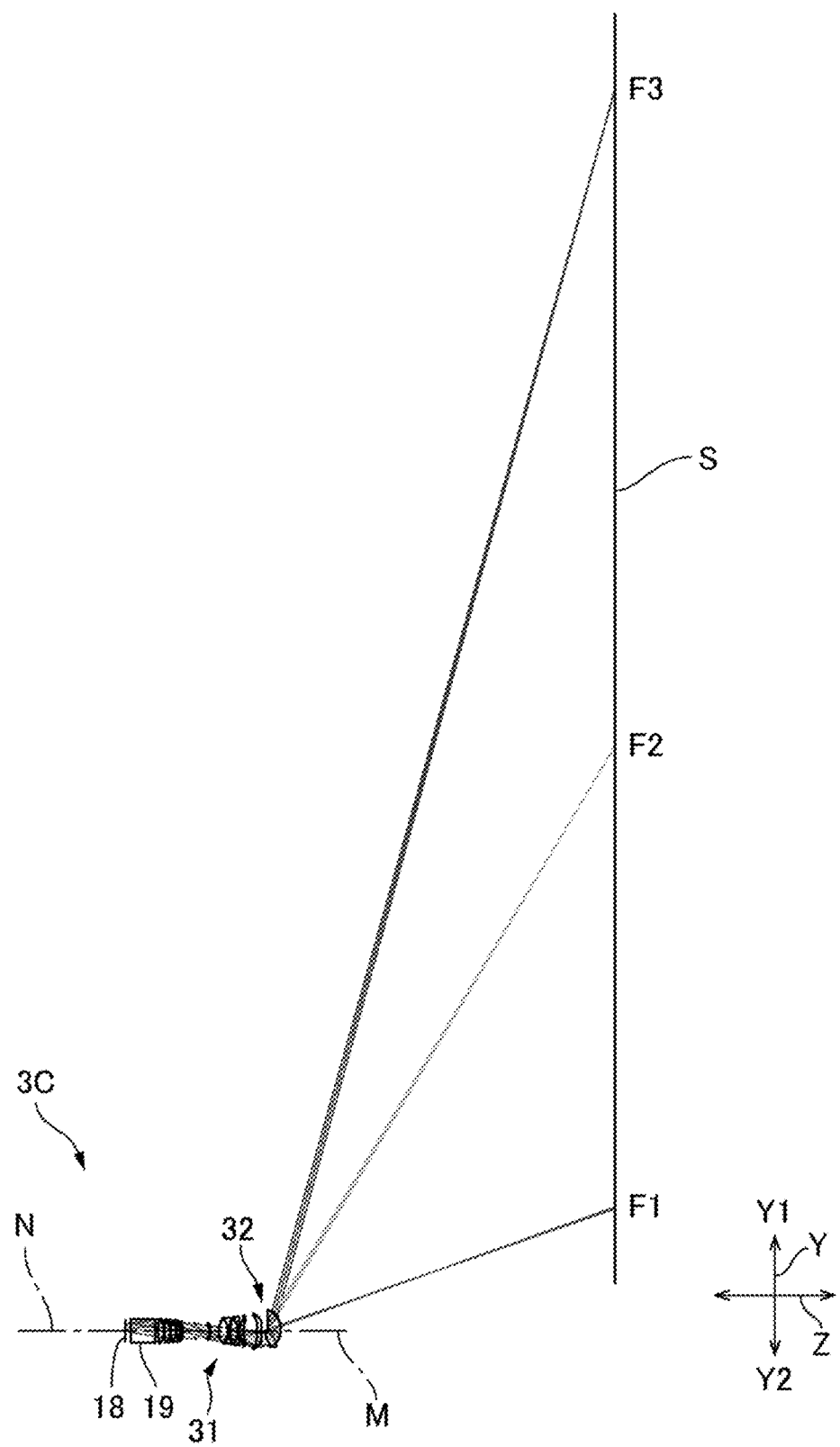
FIG. 10 is a light ray diagram diagrammatically showing the entire projection system according to Example 3.
Figure 11:
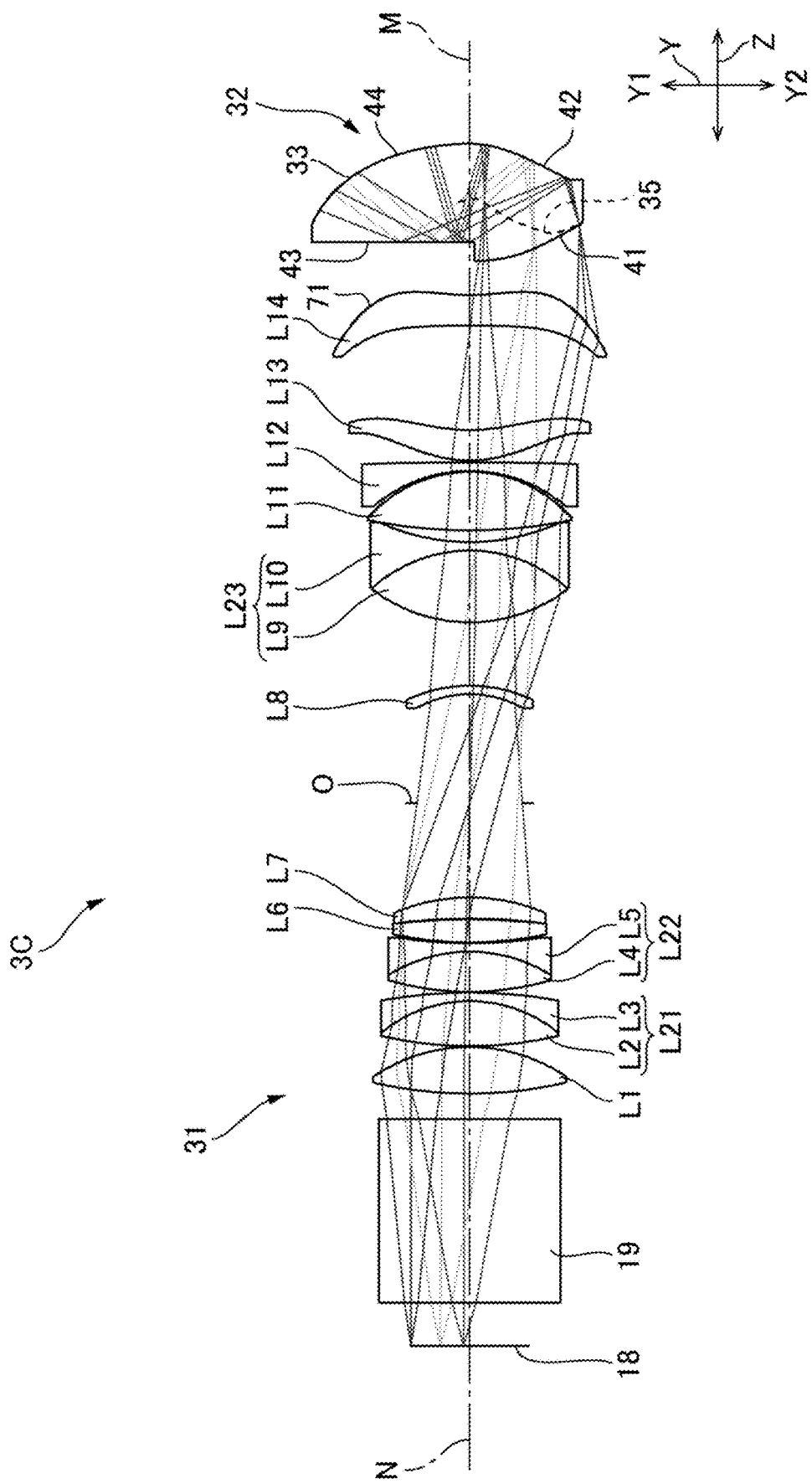
FIG. 11 is a light ray diagram of the projection system according to Example 3.
Figure 12:
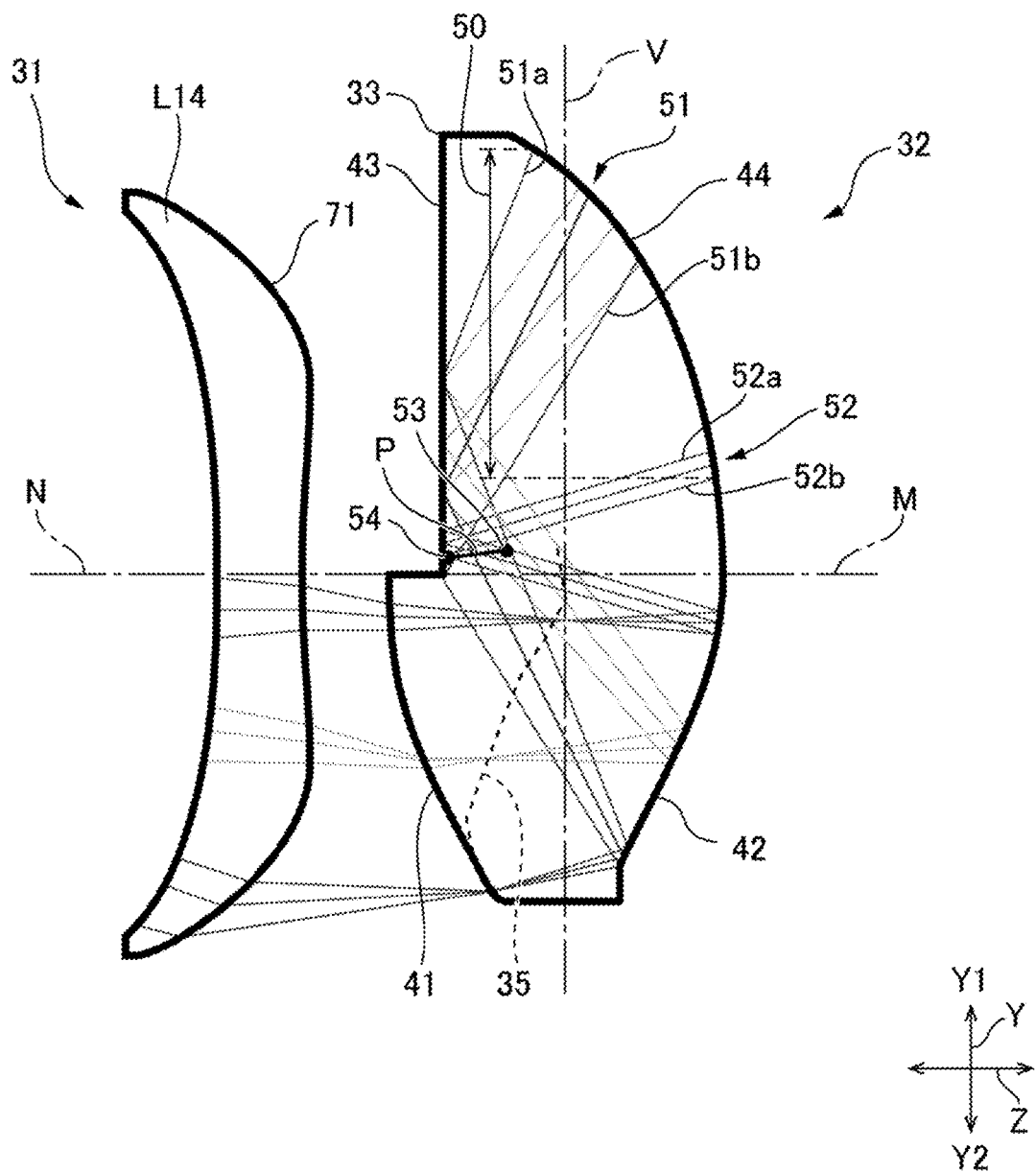
FIG. 12 is a light ray diagram of the second optical system of the projection system according to Example 3.

FIG. 10 is a light ray diagram diagrammatically showing the entirety of a projection system 3C according to Example 3. FIG. 10 diagrammatically shows the light fluxes F1 to F3, which exit out of the projection system 3C according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. FIG. 11 is a light ray diagram of the projection system 3C according to Example 3. FIG. 12 is a light ray diagram of the second optical system.

The projection system 3C according to the present example includes the first optical system 31 and the second optical system 32 sequentially arranged from the reduction side toward the enlargement side, as shown in FIG. 11. The first optical system 31 is a refractive optical system including a plurality of lenses. The second optical system 32 is the single optical element 33. The optical element 33 has the first transmissive surface 41, the first reflection surface 42, the second reflection surface 43, and the second transmissive surface 44 arranged from the reduction side in the order of light passage. The first transmissive surface 41 has a convex shape protruding toward the reduction side. The first reflection surface 42 has a concave shape. The second reflection surface 43 has a flat shape. That is, the second reflection surface 43 is a flat mirror. The second transmissive surface 44 has a convex shape protruding toward the enlargement side.

The liquid crystal panels 18 of the image formation section 2 are disposed in the reduction-side image formation plane of the projection system 3C. The liquid crystal panels 18 form the projection images on one side of the first optical axis N of the first optical system 31 in a plane perpendicular to the first optical axis N. The screen S is disposed in the enlargement-side image formation plane of the projection system. The intermediate image 35 conjugate with the reduction-side image formation plane is formed between the first optical system 31 and the first reflection surface 42 of the optical element 33. The intermediate image 35 is conjugate also with the enlargement-side image formation plane. In the present example, the intermediate image 35 is formed inside the optical element 33. That is, the intermediate image 35 is formed between the first transmissive surface 41 and the first reflection surface 42 of the optical element 33. The intermediate image 35 is formed on the side opposite the screen S with respect to the first optical axis N of the first optical system 31.

The first optical axis N of the first optical system 31 extends in the axis-Z direction in the present example. FIGS. 10, 11, and 12 are each a light ray diagram in the plane YZ. The liquid crystal panels 18 form the projection images on the upper side Y1 of the first optical axis N of the first optical system 31. The intermediate image 35 is formed on the lower side Y2 of the first optical axis N of the first optical system 31. The screen S is disposed at the upper side Y1 of the optical axis of the first optical system.

The first optical system 31 includes the cross dichroic prism 19 and 14 lenses L1 to L14, as shown in FIG. 11. The lenses L1 to L14 are arranged in the presented order from the reduction side toward the enlargement side. In the present example, the lenses L2 and L3 are bonded to each other into the first doublet L21. The lenses L4 and L5 are bonded to each other into the second doublet L22. The lenses L9 and L10 are bonded to each other into the third doublet L23. The aperture O is disposed between the lens L7 and the lens L8.

The optical element 33 is designed by using the second optical axis M of the first reflection surface 42 as the axis in the design stage. In other words, the second optical axis M is the design-stage optical axis of the first transmissive surface 41, the first reflection surface 42, the second reflection surface 43, and the second transmissive surface 44. The second optical axis M of the first reflection surface 42 coincides with the first optical axis N of the first optical system 31, as shown in FIG. 12. The second optical axis M of the first reflection surface 42 therefore extends along the axis Z. The first transmissive surface 41 and the first reflection surface 42 are located at the lower side Y2 of the second optical axis M. The second reflection surface 43 and the second transmissive surface 44 are located at the upper side Y1 of the second optical axis M. The first transmissive surface 41, the first reflection surface 42, and the second transmissive surface 44 of the optical element 33 are each an aspheric surface.

The second reflection surface 43 is perpendicular to the second optical axis M of the first reflection surface 42. The second reflection surface 43 is located between the enlargement-side first surface 71 of the lens L14 (first lens), which is located in a position closest to the enlargement side in the first optical system 31, and the first reflection surface 42 in the axis-Z direction. The second transmissive surface 44 is shifted from the second reflection surface 43 toward the first reflection surface 42 in the axis-Z direction. In the present example, the second reflection surface 43 is closer to the first transmissive surface 41 than to the second transmissive surface 44 along the second optical axis M. The thickness between the first reflection surface 42 and the second reflection surface 43 is therefore greater than that in the optical element in Example 1. The first reflection surface 42 is a reflection coating layer provided on the enlargement-side surface of the optical element 33. The second reflection surface 43 is a reflection coating layer provided on a flat surface of the optical element 33 that is the surface located at the upper side Y1 of the first optical axis N of the first optical system 31 and facing the first optical system 31. The aspheric surfaces are each a free-form surface in some cases. Also in this case, the free-form surfaces are designed by using the second optical axis M as the design-stage axis.

The pupil P of the second optical system 32 is located inside the optical element 33. The pupil P of the second optical system 32 in the plane YZ is defined by the line that connects the upper intersection 53, where the upper peripheral light ray 51a of the upper end light flux 51 passing through the axis-Y-direction upper end of the effective light ray range of the second transmissive surface 44 and the upper peripheral light ray 52a of the lower end light flux 52 passing through the axis-Y-direction lower end of the effective light ray range intersect each other in the plane YZ, to the lower intersection 54, where the lower peripheral light ray 51b of the upper end light flux 51 and the lower peripheral light ray 52b of the lower end light flux 52 intersect each other in the plane YZ. The pupil P is formed between the second reflection surface 43 and the second transmissive surface 44. The pupil P inclines with respect to the imaginary vertical line V perpendicular to the second optical axis M of the first reflection surface 42 in the plane YZ.

Lens Data

Data on the lenses of the projection system 3C are listed below. The surfaces of the lenses are numbered sequentially from the reduction side toward the enlargement side. Reference characters are given to the lenses, the first transmissive surface, the first reflection surface, the second reflection surface, and the second transmissive surface. Data labeled with a surface number that does not correspond to any of the lenses, the first transmissive surface, the first reflection surface, the second reflection surface, and the second transmissive surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/ reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.7696 |
| | 2 | Spherical | Infinity | 3.0000 | | Refraction | 9.9034 |
| | 3 | Spherical | Infinity | 0.0000 | | Refraction | 10.3582 |
| | 4 | Spherical | Infinity | 0.0000 | | Refraction | 10.3582 |
| | 5 | Spherical | Infinity | 0.0000 | | Refraction | 10.3582 |

-continued

| Reference character | Surface number | Shape | R | D | Glass material | Refraction/reflection | C |
|---|---|---|---|---|---|---|---|
| L1 | 6 | Spherical | 51.9891 | 5.4678 | 447563.8297 | Refraction | 10.5212 |
| | 7 | Spherical | −20.7689 | 0.1000 | | Refraction | 10.5781 |
| L2 | 8 | Spherical | 47.0330 | 5.2695 | 474127.7576 | Refraction | 9.6545 |
| L3 | 9 | Spherical | −17.0528 | 1.0000 | 839457.3249 | Refraction | 9.3191 |
| | 10 | Spherical | −61.1505 | 0.1000 | | Refraction | 9.2209 |
| L4 | 11 | Spherical | 35.0321 | 4.7004 | 450743.7999 | Refraction | 8.8455 |
| L5 | 12 | Spherical | −18.5944 | 1.0000 | 836125.392 | Refraction | 8.5243 |
| | 13 | Spherical | 56.4354 | 0.1000 | | Refraction | 8.3464 |
| L6 | 14 | Spherical | 44.8397 | 2.6819 | 846663.2378 | Refraction | 8.3561 |
| | 15 | Spherical | −85.8255 | 0.0999 | | Refraction | 8.2553 |
| L7 | 16 | Spherical | −69.7944 | 2.4898 | 484473.799 | Refraction | 8.2535 |
| | 17 | Spherical | −23.2247 | 11.0686 | | Refraction | 8.1000 |
| O | 18 | Spherical | Infinity | 12.7667 | | Refraction | 6.2883 |
| L8 | 19 | Spherical | −13.1733 | 1.0000 | 453684.8876 | Refraction | 6.4000 |
| | 20 | Spherical | −17.7632 | 7.4374 | | Refraction | 6.8563 |
| L9 | 21 | Spherical | 19.5630 | 8.4166 | 622385.3342 | Refraction | 10.8178 |
| L10 | 22 | Spherical | −17.6036 | 1.0000 | 844312.2605 | Refraction | 10.6915 |
| | 23 | Spherical | 26.6261 | 1.3846 | | Refraction | 10.8498 |
| L11 | 24 | Spherical | 63.4332 | 6.8516 | 646760.316 | Refraction | 10.8549 |
| | 25 | Spherical | −16.4143 | 0.1000 | | Refraction | 11.1821 |
| L12 | 26 | Spherical | −18.0275 | 1.0000 | 755000.5232 | Refraction | 10.9805 |
| | 27 | Spherical | −387.9993 | 0.2271 | | Refraction | 11.8487 |
| L13 | 28 | Aspheric | 15.0316 | 3.5898 | E48R_ZEON | Refraction | 13.0139 |
| | 29 | Aspheric | 22.1622 | 12.2378 | | Refraction | 13.3100 |
| L14 | 30 | Aspheric | −158.5708 | 3.5898 | E48R_ZEON | Refraction | 14.8708 |
| | 31 | Aspheric | 26.6506 | 3.9888 | | Refraction | 15.4374 |
| | 32 | Spherical | Infinity | 0.0000 | | Refraction | 13.8441 |
| 41 | 33 | Aspheric | 33.1970 | 13.7460 | Z330R_ZEON | Refraction | 13.1435 |
| | 34 | Spherical | Infinity | 0.0000 | Z330R_ZEON | Refraction | 11.2461 |
| 42 | 35 | Aspheric | −12.0743 | 0.0000 | Z330R_ZEON | Reflection | 12.0727 |
| | 36 | Spherical | Infinity | −11.5403 | Z330R_ZEON | Refraction | 21.2807 |
| 43 | 37 | Spherical | Infinity | 0.0000 | Z330R_ZEON | Reflection | 12.4316 |
| | 38 | Spherical | Infinity | 11.5403 | Z330R_ZEON | Refraction | 12.4316 |
| 44 | 39 | Aspheric | −30.1417 | 65.8130 | | Refraction | 18.6612 |
| | 40 | Spherical | Infinity | 56.8385 | | Refraction | 290.7946 |
| | 41 | Spherical | Infinity | 180.0883 | | Refraction | 501.5129 |
| S | 42 | Spherical | Infinity | 0.0000 | | Refraction | 1169.2503 |

The aspheric coefficients of each of the aspheric surfaces are listed below.

| Surface number | S28 | S29 | S30 | S31 |
|---|---|---|---|---|
| Radius of curvature in axis-Y direction | 15.03160626 | 22.16222606 | −158.5707752 | 26.65059873 |
| Conic constant (k) | −0.287849533 | −5.127826903 | 90 | 0 |
| Fourth-order coefficient (A) | −9.67981E−05 | −5.29067E−05 | −6.81685E−06 | −2.59755E−04 |
| Sixth-order coefficient (B) | −4.42544E−08 | −1.31491E−07 | −4.06211E−07 | 4.52246E−07 |
| Eighth-order coefficient (C) | −5.89956E−10 | 4.28438E−10 | 1.02189E−09 | −5.02946E−10 |
| Tenth-order coefficient (D) | | | | |
| Twelfth-order coefficient (E) | | | | |

| Surface number | S33 | S35 | S39 |
|---|---|---|---|
| Radius of curvature in axis-Y direction | 33.19697456 | −12.07434298 | −30.14166617 |
| Conic constant (k) | 4.972124815 | −3.121620834 | 1.293584918 |
| Fourth-order coefficient (A) | 2.76176E−04 | −3.58655E−05 | 3.82767E−06 |
| Sixth-order coefficient (B) | −2.88016E−06 | 4.64911E−07 | −1.23652E−08 |
| Eighth-order coefficient (C) | 7.00498E−09 | −1.70318E−09 | −1.08795E−10 |

-continued

| | | | |
|---|---|---|---|
| Tenth-order coefficient (D) | 3.51383E−11 | 3.09745E−12 | 4.28198E−13 |
| Twelfth-order coefficient (E) | −1.86786E−13 | | −5.48275E−16 |

The maximum object height, the numerical aperture, the mirror radius, the lens overall length, and TR of the projection system 3C are as follows: The maximum object height is the dimension from the first optical axis N of the projection system 3C to the farthest point therefrom in the image formation region of the surface of each of the liquid crystal panels 18. The maximum object height is expressed in millimeters. The numerical aperture is abbreviated to NA. The mirror radius is the radius of the first reflection surface in millimeters. The final lens radius is the lens radius of the second transmissive surface in millimeters. The lens overall length of the projection system 3C is the distance in millimeters from the liquid crystal panels 18 to the second transmissive surface in the axis-Z direction. TR stands for the throw ratio and is the quotient of the operation of dividing the projection distance by the axis-X-direction dimension of a projection image projected on the screen S.

| | |
|---|---|
| Maximum object height | 7.0 |
| NA | 0.2742 |
| Mirror radius | 12.1 |
| Final lens radius | 18.7 |
| Lens overall length | 141 |
| TR (0.37" 16:9) | 0.22 |

Effects and Advantages

Figure 13:
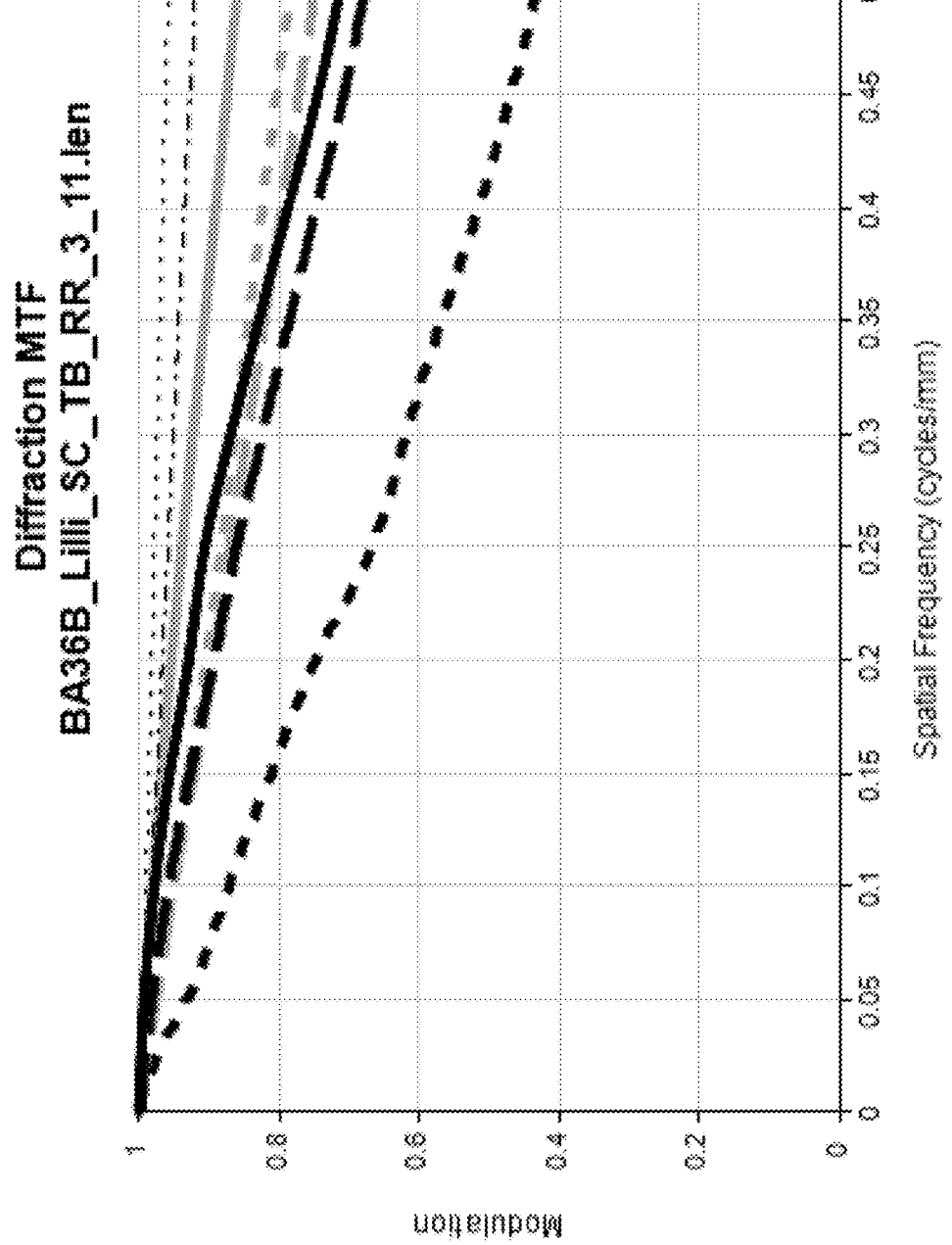
FIG. 13 shows the enlargement-side MTF of the projection system according to Example 3.

The projection system according to the present example can provide the same effects and advantages as those provided by the projection system according to Example 1. The projection system 3C according to the present example provides high resolution, as shown in FIG. 13.

Example 4

Figure 14:
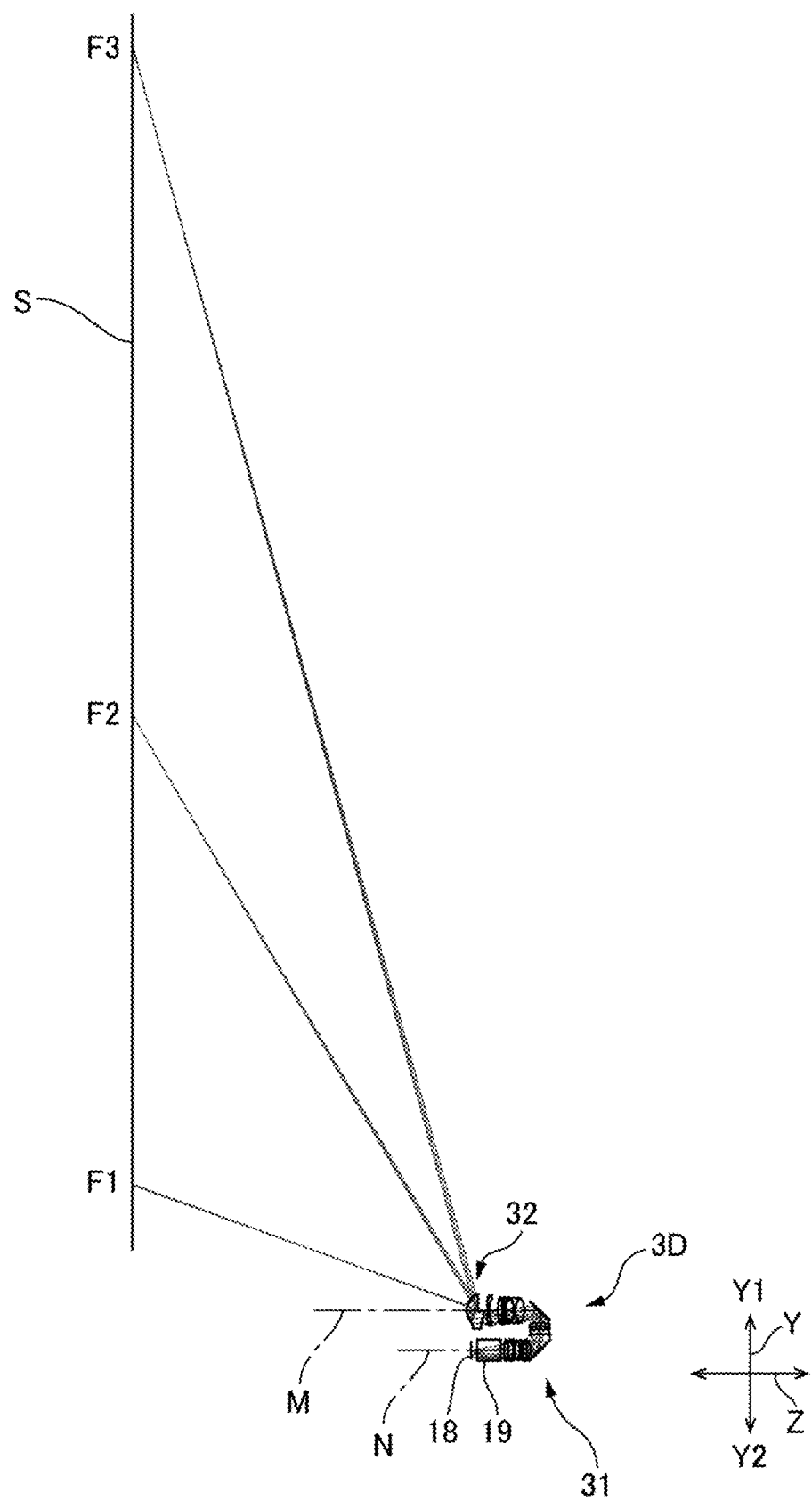
FIG. 14 is a light ray diagram diagrammatically showing the entire projection system according to Example 4.
Figure 15:
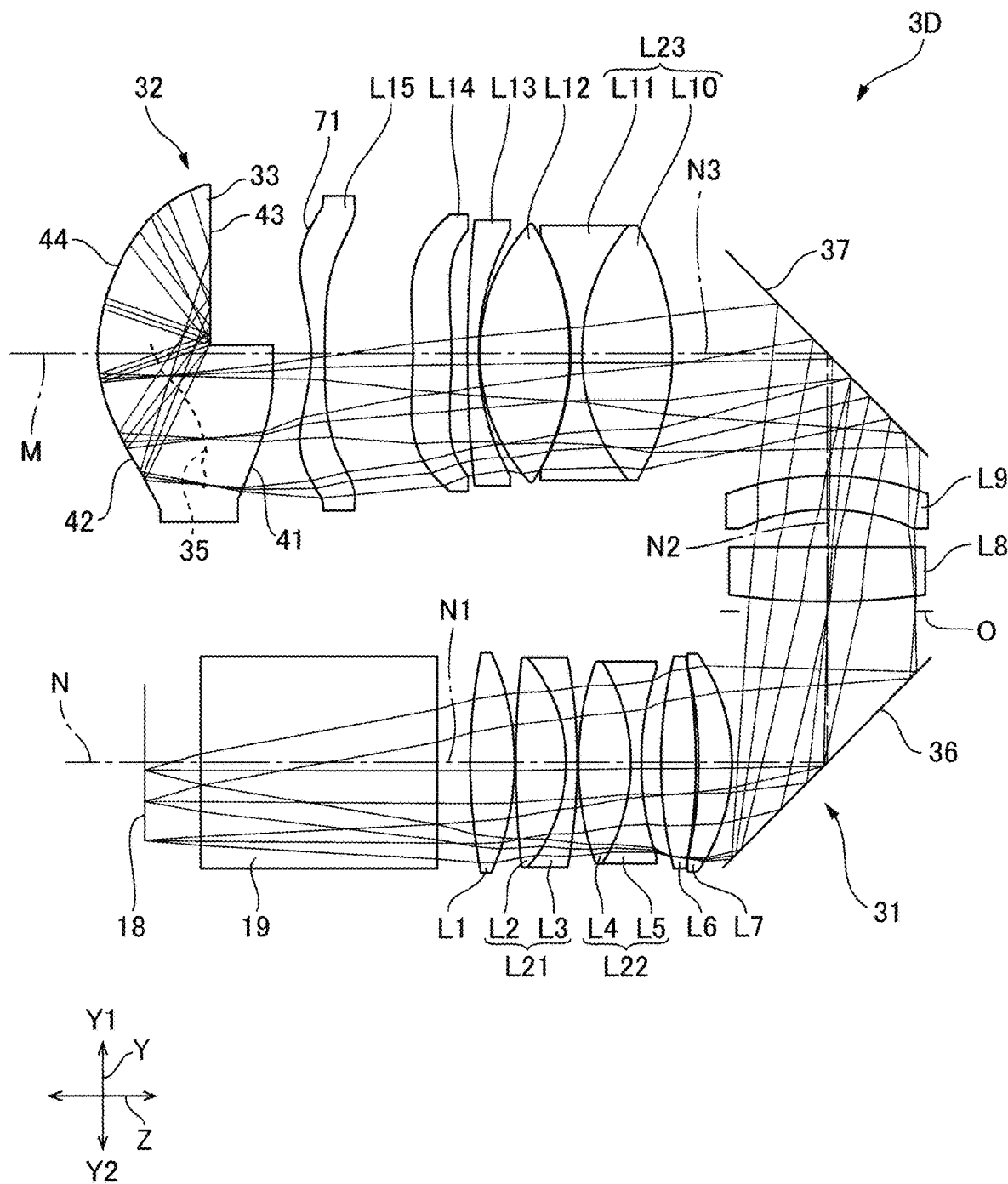
FIG. 15 is a light ray diagram of the projection system according to Example 4.
Figure 16:
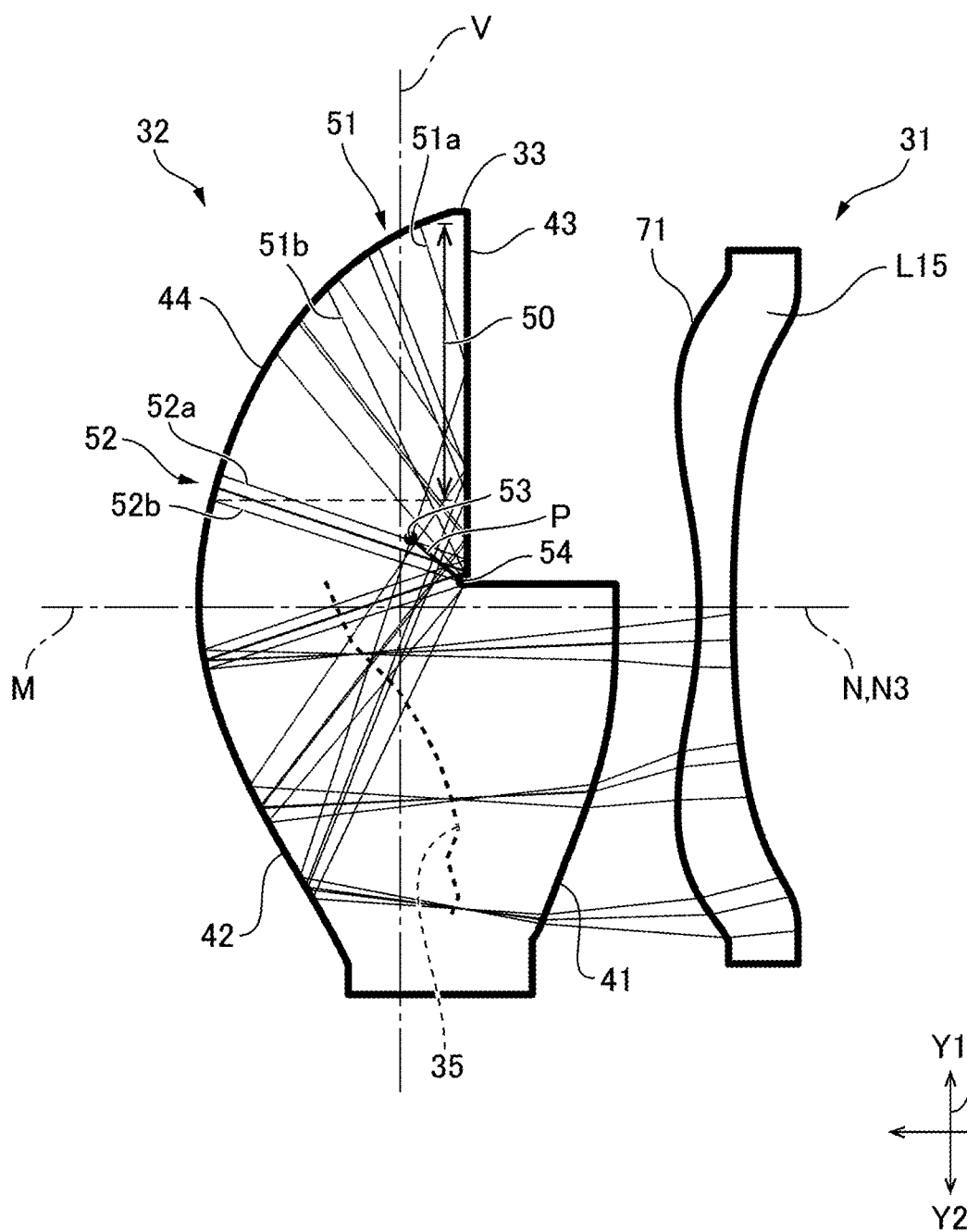
FIG. 16 is a light ray diagram of the second optical system of the projection system according to Example 4.

FIG. 14 is a light ray diagram diagrammatically showing the entire projection system according to Example 4. FIG. 14 diagrammatically shows the light fluxes F1 to F3, which exit out of a projection system 3D according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. FIG. 15 is a light ray diagram of the projection system 3D according to Example 4. FIG. 16 is a light ray diagram of the second optical system in Example 4.

The projection system according to Example 4 is based on the projection system according to Example 3, and the first optical system in Example 4 includes first and second deflectors that deflect the optical path of the first optical system. The projection system 3D according to the present example includes the first optical system 31 and the second optical system 32 sequentially arranged from the reduction side toward the enlargement side, as shown in FIG. 15. The first optical system 31 is a refractive optical system including a plurality of lenses. The second optical system 32 is the single optical element 33. The optical element 33 has the first transmissive surface 41, the first reflection surface 42, the second reflection surface 43, and the second transmissive surface 44 arranged from the reduction side in the order of light passage. The first transmissive surface 41 has a convex shape protruding toward the reduction side. The first reflection surface 42 has a concave shape. The second reflection surface 43 has a flat shape. That is, the second reflection surface 43 is a flat mirror. The second transmissive surface 44 has a convex shape protruding toward the enlargement side.

The liquid crystal panels 18 of the image formation section 2 are disposed in the reduction-side image formation plane of the projection system 3D. The liquid crystal panels 18 form the projection images on one side of the first optical axis N of the first optical system 31 in a plane perpendicular to the first optical axis N. The screen S is disposed in the enlargement-side image formation plane of the projection system. The intermediate image 35 conjugate with the reduction-side image formation plane is formed between the first optical system 31 and the first reflection surface 42 of the optical element 33. The intermediate image 35 is conjugate also with the enlargement-side image formation plane. In the present example, the intermediate image 35 is formed inside the optical element 33. That is, the intermediate image 35 is formed between the first transmissive surface 41 and the first reflection surface 42 of the optical element 33. The intermediate image 35 is formed on the side opposite the screen S with respect to the first optical axis N of the first optical system 31.

The first optical axis N of the first optical system 31 extends in the axis-Z direction in the present example. FIGS. 14, 15, and 16 are each a light ray diagram in the plane YZ. The liquid crystal panels 18 form the projection images on the upper side Y1 of the first optical axis N of the first optical system 31. The intermediate image 35 is formed on the lower side Y2 of the first optical axis N of the first optical system 31. The screen S is disposed at the upper side Y1 of the optical axis of the first optical system.

The first optical system 31 includes the cross dichroic prism 19 and 15 lenses L1 to L15, as shown in FIG. 15. The lenses L1 to L15 are arranged in the presented order from the reduction side toward the enlargement side. In the present example, the lenses L2 and L3 are bonded to each other into the first doublet L21. The lenses L4 and L5 are bonded to each other into the second doublet L22. The lenses L10 and L11 are bonded to each other into the third doublet L23. The aperture O is disposed between the lens L7 and the lens L8.

The first optical system 31 includes the first deflector 36 and the second deflector 37, which deflect the optical path of the first optical system 31. The first deflector 36 and the second deflector 37 are each a flat mirror. The first deflector 36 is disposed adjacent to and on the reduction side of the aperture O. That is, the first deflector 36 is disposed between the lens L7 and the aperture O. The second deflector 37 is shifted from the aperture O toward the enlargement side. That is, the second deflector 37 is disposed between the lens L9 and the lens L10. The first optical axis N of the first optical system 31 is divided into the first section N1 of the first optical axis that is the section at the reduction side of the first deflector 36, the second section N2 of the first optical axis that is the section at the enlargement side of the first deflector 36 but up to the second deflector 37, and the third section N3 of the first optical axis that is the section at the enlargement side of the second deflector 37, and the angle between the first section N1 of the first optical axis and the second section N2 of the first optical axis is 90°. The angle between the second section N2 of the first optical axis and the third section N3 of the first optical axis is 90°. The first section N1 of the first optical axis and the third section N3 of the first optical axis are parallel to each other. In the present example, the first section N1 of the first optical axis and the third section N3 of the first optical axis extend in parallel to each other.

That is, the first deflector 36 is so disposed as to incline by 45° with respect to the first section N1 of the first optical axis and deflects the light path of the first optical system 31 by 90° toward the upper side Y1. The second deflector 37 is so disposed as to incline by 45° with respect to the second section N2 of the first optical axis and deflects back the light path of the first optical system 31 by 180°.

The optical element 33 is designed by using the second optical axis M of the first reflection surface 42 as the axis in the design stage. The second optical axis M is the design-stage optical axis of the first transmissive surface 41, the first reflection surface 42, the second reflection surface 43, and the second transmissive surface 44. The second optical axis M of the first reflection surface 42 coincides with the third section N3 of the first optical axis N of the first optical system 31, as shown in FIG. 16. The second optical axis M of the first reflection surface 42 therefore extends along the axis Z. The first transmissive surface 41 and the first reflection surface 42 are located at the lower side Y2 of the second optical axis M. The second reflection surface 43 and the second transmissive surface 44 are located at the upper side Y1 of the second optical axis M. The first transmissive surface 41, the first reflection surface 42, and the second transmissive surface 44 of the optical element 33 are each an aspheric surface.

The second reflection surface 43 is perpendicular to the second optical axis M of the first reflection surface 42. The second reflection surface 43 is located between the enlargement-side first surface 71 of the lens L15 (first lens), which is located in a position closest to the enlargement side in the first optical system 31, and the first reflection surface 42 in the axis-Z direction. The second transmissive surface 44 is shifted from the second reflection surface 43 toward the first reflection surface 42 in the axis-Z direction. In the present example, the distance between the second reflection surface 43 and the first transmissive surface 41 along the second optical axis M is shorter than the distance between the second reflection surface 43 and the first reflection surface 42. The distance between the first transmissive surface 41 and the second reflection surface 43 is thus smaller than that in Example 2, whereby the thickness of the optical element 33 can be reduced. The first reflection surface 42 is a reflection coating layer provided on the enlargement-side surface of the optical element 33. The second reflection surface 43 is a reflection coating layer provided on a flat surface of the optical element 33 that is the surface located at the upper side Y1 of the first optical axis N of the first optical system 31 and facing the first optical system 31.

The pupil P of the second optical system 32 is located inside the optical element 33. The pupil P of the second optical system 32 in the plane YZ is defined by the line that connects the upper intersection 53, where the upper peripheral light ray 51a of the upper end light flux 51 passing through the axis-Y-direction upper end of the effective light ray range of the second transmissive surface 44 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The pupil P is formed between the second reflection surface 43 and the second transmissive surface 44. The pupil P inclines with respect to the imaginary vertical line V perpendicular to the second optical axis M of the first reflection surface 42 in the plane YZ.

Lens Data

Data on the lenses of the projection system 3D are listed below. The surfaces of the lenses are numbered sequentially from the reduction side toward the enlargement side. Reference characters are given to the lenses, the first deflector, the second deflector, the first transmissive surface, the first reflection surface, the second reflection surface, and the second transmissive surface. Data labeled with a surface number that does not correspond to any of the lenses, the first deflector, the second deflector, the first transmissive surface, the first reflection surface, the second reflection surface, and the second transmissive surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.4346 |
| | 2 | Spherical | Infinity | 3.0000 | | Refraction | 8.6451 |
| | 3 | Spherical | Infinity | 0.0000 | | Refraction | 8.9019 |
| | 4 | Spherical | Infinity | 0.0000 | | Refraction | 8.9019 |
| | 5 | Spherical | Infinity | 0.0000 | | Refraction | 8.9019 |
| L1 | 6 | Spherical | 50.8270 | 4.0115 | 452420.7925 | Refraction | 8.9702 |
| | 7 | Spherical | −24.1345 | 0.1000 | | Refraction | 8.9736 |
| L2 | 8 | Spherical | 82.7471 | 4.5650 | 450435.8328 | Refraction | 8.5449 |
| L3 | 9 | Spherical | −14.3543 | 1.0000 | 839787.3159 | Refraction | 8.3060 |
| | 10 | Spherical | −52.4674 | 0.1000 | | Refraction | 8.4024 |
| L4 | 11 | Spherical | 26.6631 | 4.7662 | 449711.8160 | Refraction | 8.2403 |
| L5 | 12 | Spherical | −17.1101 | 1.0000 | 839871.3159 | Refraction | 8.0156 |
| | 13 | Spherical | 27.0915 | 1.7962 | | Refraction | 8.0120 |

-continued

| Reference character | Surface number | Shape | R | D | Glass material | Refraction/reflection | C |
|---|---|---|---|---|---|---|---|
| L6 | 14 | Spherical | 40.6115 | 3.1258 | 846663.2378 | Refraction | 8.4268 |
|  | 15 | Spherical | −50.7121 | 0.2725 |  | Refraction | 8.6393 |
| L7 | 16 | Spherical | −37.4115 | 3.0025 | 449116.8148 | Refraction | 8.6396 |
|  | 17 | Spherical | −16.9048 | 8.6396 |  | Refraction | 8.8686 |
| 36 | 18 | Spherical | Infinity | 0.0000 |  | Reflection | 12.3749 |
| O | 19 | Spherical | Infinity | −13.5202 |  | Refraction | 8.3195 |
|  | 20 | Spherical | Infinity | −0.9153 |  | Refraction | 7.6538 |
| L8 | 21 | Spherical | −65.6525 | −4.8780 | 846663.2378 | Refraction | 8.0997 |
|  | 22 | Spherical | 3125.4509 | −3.3613 |  | Refraction | 8.1397 |
| L9 | 23 | Spherical | 19.1947 | −3.0000 | 437001.9510 | Refraction | 8.1626 |
|  | 24 | Spherical | 26.7008 | −10.9971 |  | Refraction | 8.6686 |
| 37 | 25 | Spherical | Infinity | 0.0000 |  | Reflection | 12.5974 |
|  | 26 | Spherical | Infinity | 14.0273 |  | Refraction | 9.5102 |
| L10 | 27 | Spherical | 21.9033 | 8.2387 | 586943.3682 | Refraction | 10.7976 |
| L11 | 28 | Spherical | −17.5180 | 1.0000 | 842194.2851 | Refraction | 10.5369 |
|  | 29 | Spherical | 21.0633 | 0.1025 |  | Refraction | 10.4819 |
| L12 | 30 | Spherical | 21.5211 | 8.1655 | 547640.4223 | Refraction | 10.5222 |
|  | 31 | Spherical | −17.0182 | 0.1000 |  | Refraction | 10.7793 |
| L13 | 32 | Spherical | −22.5505 | 1.0000 | 834805.4272 | Refraction | 10.5036 |
|  | 33 | Spherical | −107.8245 | 1.4331 |  | Refraction | 10.9110 |
| L14 | 34 | Aspheric | 39.4785 | 3.4869 | E48R_ZEON | Refraction | 10.9930 |
|  | 35 | Aspheric | 34.6629 | 8.0645 |  | Refraction | 11.8775 |
| L15 | 36 | Aspheric | −131.3226 | 1.2273 | E48R_ZEON | Refraction | 12.6633 |
|  | 37 | Aspheric | 14.4444 | 3.4778 |  | Refraction | 12.9917 |
|  | 38 | Spherical | Infinity | 0.0000 |  | Refraction | 12.6374 |
| 41 | 39 | Aspheric | 113.9278 | 15.9511 | Z330R_ZEON | Refraction | 12.4079 |
|  | 40 | Spherical | Infinity | 0.0000 | Z330R_ZEON | Refraction | 11.1300 |
| 42 | 41 | Aspheric | −11.6460 | 0.0000 | Z330R_ZEON | Reflection | 14.0000 |
|  | 42 | Spherical | Infinity | −10.2667 | Z330R_ZEON | Refraction | 22.4385 |
| 43 | 43 | Spherical | Infinity | 0.0000 | Z330R_ZEON | Reflection | 9.8921 |
|  | 44 | Spherical | Infinity | 10.2667 | Z330R_ZEON | Refraction | 9.8921 |
| 44 | 45 | Aspheric | −14.6388 | 65.8130 |  | Refraction | 14.6645 |
|  | 46 | Spherical | Infinity | 56.8385 |  | Refraction | 290.0373 |
|  | 47 | Spherical | Infinity | 180.0883 |  | Refraction | 500.8317 |
| S | 48 | Spherical | Infinity | 0.0000 |  | Refraction | 1169.3698 |

The aspheric coefficients of each of the aspheric surfaces are listed below.

| Surface number | S34 | S35 | S36 | S37 |
|---|---|---|---|---|
| Radius of curvature in axis-Y direction | 39.4785 | 34.6629 | −131.3226 | 14.4444 |
| Conic constant (k) | −77.63737 | −87.96154 | 90 | 0 |
| Fourth-order coefficient (A) | −1.26038E−04 | −1.91858E−04 | −1.39226E−04 | −3.49637E−04 |
| Sixth-order coefficient (B) | 3.91946E−08 | 1.04516E−08 | −2.46009E−07 | 1.53444E−08 |
| Eighth-order coefficient (C) | −2.57161E−09 | 3.06405E−10 | 4.13902E−09 | 1.02093E−09 |
| Tenth-order coefficient (D) |  |  |  |  |
| Twelfth-order coefficient (E) |  |  |  |  |

| Surface number | S39 | S41 | S45 |
|---|---|---|---|
| Radius of curvature in axis-Y direction | 113.9278 | −11.6460 | −14.6388 |
| Conic constant (k) | 74.15390 | −2.29917 | −0.13158 |
| Fourth-order coefficient (A) | 4.55967E−04 | 2.02380E−05 | 1.19216E−04 |
| Sixth-order coefficient (B) | −5.82578E−06 | −2.93184E−07 | −5.95649E−07 |
| Eighth-order coefficient (C) | 3.89927E−08 | 2.00740E−09 | 9.55740E−10 |
| Tenth-order coefficient (D) | −1.48682E−10 | −3.47341E−12 | 3.73030E−12 |

-continued

| | | |
|---|---|---|
| Twelfth-order coefficient (E) | 2.43491E−13 | −1.12163E−14 |

The maximum object height, the numerical aperture, the mirror radius, the lens overall length, and TR of the projection system 3D are as follows: The maximum object height is the dimension from the first optical axis N of the projection system 3D to the farthest point therefrom in the image formation region of the surface of each of the liquid crystal panels 18. The maximum object height is expressed in millimeters. The numerical aperture is abbreviated to NA. The mirror radius is the radius of the first reflection surface in millimeters. The final lens radius is the lens radius of the second transmissive surface in millimeters. The lens overall length of the projection system 3D is the distance in millimeters from the liquid crystal panels 18 to the second transmissive surface in the axis-Z direction. TR stands for the throw ratio and is the quotient of the operation of dividing the projection distance by the axis-X-direction dimension of a projection image projected on the screen S.

| | |
|---|---|
| Maximum object height | 7.0 |
| NA | 0.2742 |
| Mirror radius | 14.0 |
| Final lens radius | 14.7 |
| Lens overall length | 165 |
| TR (0.37" 16:9) | 0.22 |

Effects and Advantages

The projection system according to the present example can provide the same effects and advantages as those provided by the projection system according to Example 1. In the present example, in which the first deflector 36 and the second deflector 37 are provided, the optical path of the first optical system 31 is deflected back. The area occupied by the first optical system 31 can therefore be reduced when taken along the plane XZ.

FIG. 17 shows the enlargement-side MTF of the projection system 3D. The projection system 3D according to the present example provides high resolution, as shown in FIG. 17.

In the projection systems described above, a lens may be further disposed at the enlargement side of the second optical system.

In the projection systems according to Examples 1 to 4, the second reflection surface 43 is perpendicular to the second optical axis M of the first reflection surface 42 and may instead not be perpendicular thereto. That is, the second reflection surface 43 only needs to intersect the second optical axis M of the first reflection surface 42.

In the projection systems according to Examples 2 and 4, either the first or second deflector may be omitted.

Further, in Examples 2 and 4, in which the first and second deflectors are disposed, the optical path of the light rays from the reduction-side image formation plane is deflected back by 180°. The deflection angle and the deflection direction are, however, not limited to those described above.

What is claimed is:

1. A projection system comprising:
a first optical system including a first lens; and
a second optical system including an optical element and disposed at an enlargement side of the first optical system,
wherein the first lens is disposed in a position closest to the enlargement side in the first optical system,
the optical element has a first transmissive surface, a first reflection surface disposed at the enlargement side of the first transmissive surface, a second reflection surface disposed at the enlargement side of the first reflection surface, and a second transmissive surface disposed at the enlargement side of the second reflection surface,
the second reflection surface is disposed between the first reflection surface and a first surface of the first lens that is a surface on the enlargement side in a direction along a first optical axis of the first optical system, and
the second transmissive surface is disposed at a side opposite a side where the first optical system is located with respect to the second reflection surface in the direction along the first optical axis.

2. The projection system according to claim 1,
wherein the first reflection surface has a concave shape.

3. The projection system according to claim 1,
wherein the second transmissive surface has a convex shape protruding toward the enlargement side.

4. The projection system according to claim 1,
wherein the first transmissive surface has a convex shape protruding toward a reduction side.

5. The projection system according to claim 1,
wherein the second reflection surface is a flat surface.

6. The projection system according to claim 1,
wherein the first reflection surface is an aspheric surface.

7. The projection system according to claim 1,
wherein the second transmissive surface is an aspheric surface.

8. The projection system according to claim 1,
wherein the first transmissive surface is an aspheric surface.

9. The projection system according to claim 1,
wherein the first transmissive surface and the first reflection surface are located at one side of a second optical axis of the first reflection surface, and
the second reflection surface and the second transmissive surface are located at other side of the second optical axis.

10. The projection system according to claim 9,
wherein axes X, Y, and Z are three axes perpendicular to one another, an axis-X direction being a width direction of an enlargement-side image formation plane, an axis-Y direction being an upward/downward direction of the enlargement-side image formation plane, and an axis-Z direction being a direction perpendicular to the enlargement-side image formation plane,
a pupil that connects an upper intersection to a lower intersection inclines with respect to an imaginary vertical line perpendicular to the second optical axis in a plane YZ containing the first and second optical axes, the upper intersection is an intersection where an upper peripheral light ray of an upper end light flux passing through an upper end of an effective light ray range of the second transmissive surface that is an upper end in the axis-Y direction and an upper peripheral light ray of a lower end light flux passing through a lower end of the effective light ray range that is a lower end in the axis-Y direction intersect each other in the plane YZ, and the lower intersection is an intersection where a lower peripheral light ray of the upper end light flux and a lower peripheral light ray of the lower end light flux intersect each other in the plane YZ.

11. The projection system according to claim 1, wherein the first optical system includes a first deflector that deflects an optical path of the first optical system.

12. The projection system according to claim 11, wherein the first deflector is a flat mirror.

13. The projection system according to claim 11, wherein an angle between a first section of the first optical axis that is a section at a reduction side of the first deflector and a second section of the first optical axis that is a section at the enlargement side of the first deflector is 90°.

14. The projection system according to claim 13, wherein the first optical system includes a second deflector that deflects the optical path toward the enlargement side of the first deflector.

15. The projection system according to claim 14, wherein the second deflector is a flat mirror.

16. The projection system according to claim 14, wherein an angle between the second section of the first optical axis, which is a section at the reduction side of the second deflector, and a third section of the first optical axis that is a section at the enlargement side of the second deflector is 90°.

17. The projection system according to claim 16, wherein the first section and the third section are parallel to each other.

18. The projection system according to claim 1, wherein an intermediate image is formed between the first optical system and the first reflection surface.

19. A projector comprising:
the projection system according to claim 1; and
an image formation section that forms a projection image in a reduction-side image formation plane of the projection system.

* * * * *